(12) United States Patent
Gschwind et al.

(10) Patent No.: US 10,671,387 B2
(45) Date of Patent: *Jun. 2, 2020

(54) VECTOR MEMORY ACCESS INSTRUCTIONS FOR BIG-ENDIAN ELEMENT ORDERED AND LITTLE-ENDIAN ELEMENT ORDERED COMPUTER CODE AND DATA

(71) Applicant: International Business Machines Corporation, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 545 days.

This patent is subject to a terminal disclaimer.

(21) Appl. No.: 14/300,559

(22) Filed: Jun. 10, 2014

(65) Prior Publication Data
US 2015/0355905 A1    Dec. 10, 2015

(51) Int. Cl.
*G06F 9/30* (2018.01)
*G06F 15/80* (2006.01)

(52) U.S. Cl.
CPC ...... *G06F 9/30036* (2013.01); *G06F 9/30032* (2013.01); *G06F 9/30043* (2013.01); *G06F 15/8061* (2013.01)

(58) Field of Classification Search
CPC .. G06F 7/768; G06F 9/30025; G06F 9/30043; G06F 9/30189
See application file for complete search history.

(56) References Cited

U.S. PATENT DOCUMENTS 5,687,337 A * 11/1997 Carnevale ........... G06F 9/30025
                                                    711/E12.017
5,781,763 A    7/1998 Beukema
(Continued)

FOREIGN PATENT DOCUMENTS

GB    2464292 A2    4/2010

OTHER PUBLICATIONS

"IEEE Standard for Verilog® Hardware Description Language" Published Apr. 7, 2006.*

(Continued)

*Primary Examiner* — Jacob Petranek
(74) *Attorney, Agent, or Firm* — Cantor Colburn LLP; David Quinn

(57) ABSTRACT

Embodiments relate to vector memory access instructions for big-endian (BE) element ordered computer code and little-endian (LE) element ordered computer code. An aspect includes determining a mode of a computer system comprising one of a BE mode and an LE mode. Another aspect includes determining a code type comprising one of BE code and LE code. Another aspect includes determining a data type of data in a main memory that is associated with the object code comprising one of BE data and LE data. Another aspect includes based on the mode, code type, and data type, inserting a memory access instruction into the object code to perform a memory access associated with the vector in the object code, such that the memory access instruction performs element ordering of elements of the vector, and data ordering within the elements of the vector, in accordance with the determined mode, code type, and data type.

20 Claims, 10 Drawing Sheets

(56) References Cited

U.S. PATENT DOCUMENTS

| | | | |
|---|---|---|---|
| 5,848,436 A | 12/1998 | Sartorius | |
| 5,928,349 A * | 7/1999 | Loen | G06F 9/34 |
| | | | 712/1 |
| 6,055,591 A | 4/2000 | Nordling | |
| 6,212,539 B1 | 4/2001 | Huck | |
| 6,728,874 B1 * | 4/2004 | Sijstermans | G06F 7/768 |
| | | | 712/222 |
| 7,376,812 B1 | 5/2008 | Sanghavi et al. | |
| 7,624,251 B2 | 11/2009 | Gonion et al. | |
| 8,856,546 B2 | 10/2014 | Gueron et al. | |
| 9,274,791 B2 * | 3/2016 | Boersma | G06F 9/30 |
| 2005/0013323 A1 | 1/2005 | Nixon | |
| 2005/0066146 A1 | 3/2005 | Barry | |
| 2005/0125647 A1 | 6/2005 | Symes | |
| 2005/0132165 A1 * | 6/2005 | Ford | G06F 9/30025 |
| | | | 712/22 |
| 2006/0265552 A1 | 11/2006 | Davis | |
| 2007/0226469 A1 * | 9/2007 | Wilson | G06F 7/768 |
| | | | 712/225 |
| 2008/0114969 A1 * | 5/2008 | Gonion | G06F 9/30032 |
| | | | 712/223 |
| 2008/0140992 A1 * | 6/2008 | Rajaram | G06F 9/30025 |
| | | | 712/204 |
| 2011/0072170 A1 * | 3/2011 | Flachs | G06F 9/30007 |
| | | | 710/22 |
| 2011/0082999 A1 * | 4/2011 | Lai | G06F 9/30025 |
| | | | 711/201 |
| 2014/0019506 A1 | 1/2014 | Kuo | |
| 2014/0189231 A1 | 7/2014 | Maydan | |
| 2014/0230077 A1 | 8/2014 | Muff et al. | |
| 2015/0019840 A1 | 1/2015 | Anderson et al. | |
| 2015/0234934 A1 * | 8/2015 | Steinmacher-Burow | |
| | | | G06F 17/30958 |
| | | | 707/800 |
| 2015/0248293 A1 * | 9/2015 | Gschwind | G06F 9/30036 |
| | | | 712/225 |
| 2015/0355906 A1 | 12/2015 | Gschwind | |
| 2017/0123792 A1 | 5/2017 | Razario | |

OTHER PUBLICATIONS

"IEEE Standard VHDL Language Reference Manual" Published May 17, 2002.*

List of IBM Patents or Patent Applications Treated as Related; Date Filed: Jun. 10, 2014; pp. 1-2.

IBM, "Power ISA User Instructions Set Architecture," Version 2.07 published May 22, 2013; pp. 1-1496 (submitted in seven separate parts).

List of IBM Patents or Patent Applications Treated as Related; May 27, 2015; pp. 1-2.

Mitra et al., Use of SIMD Vector Operations to Accelerate Application Code Performance on Low-Powered ARM and Intel Platforms, IEEE, 2013, 39 pages.

* cited by examiner

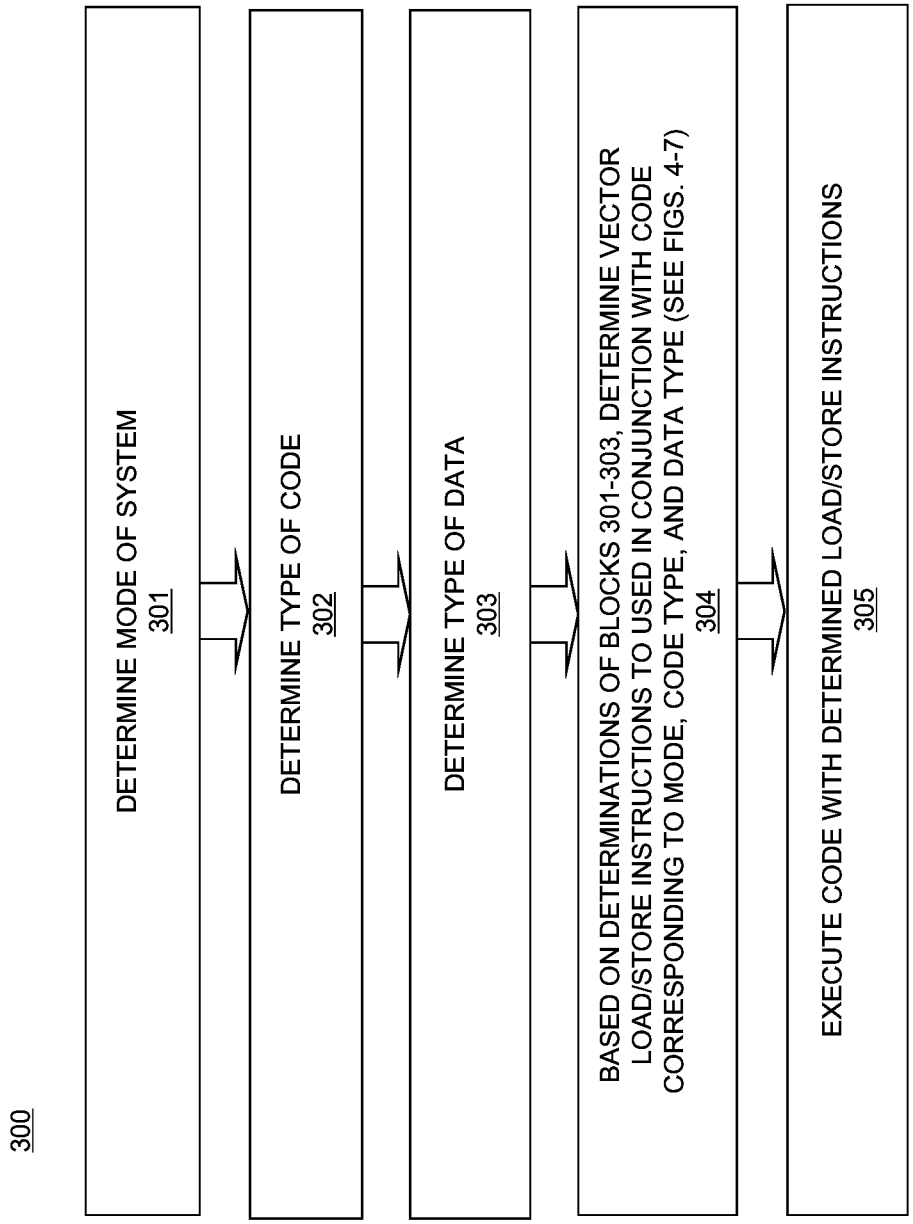

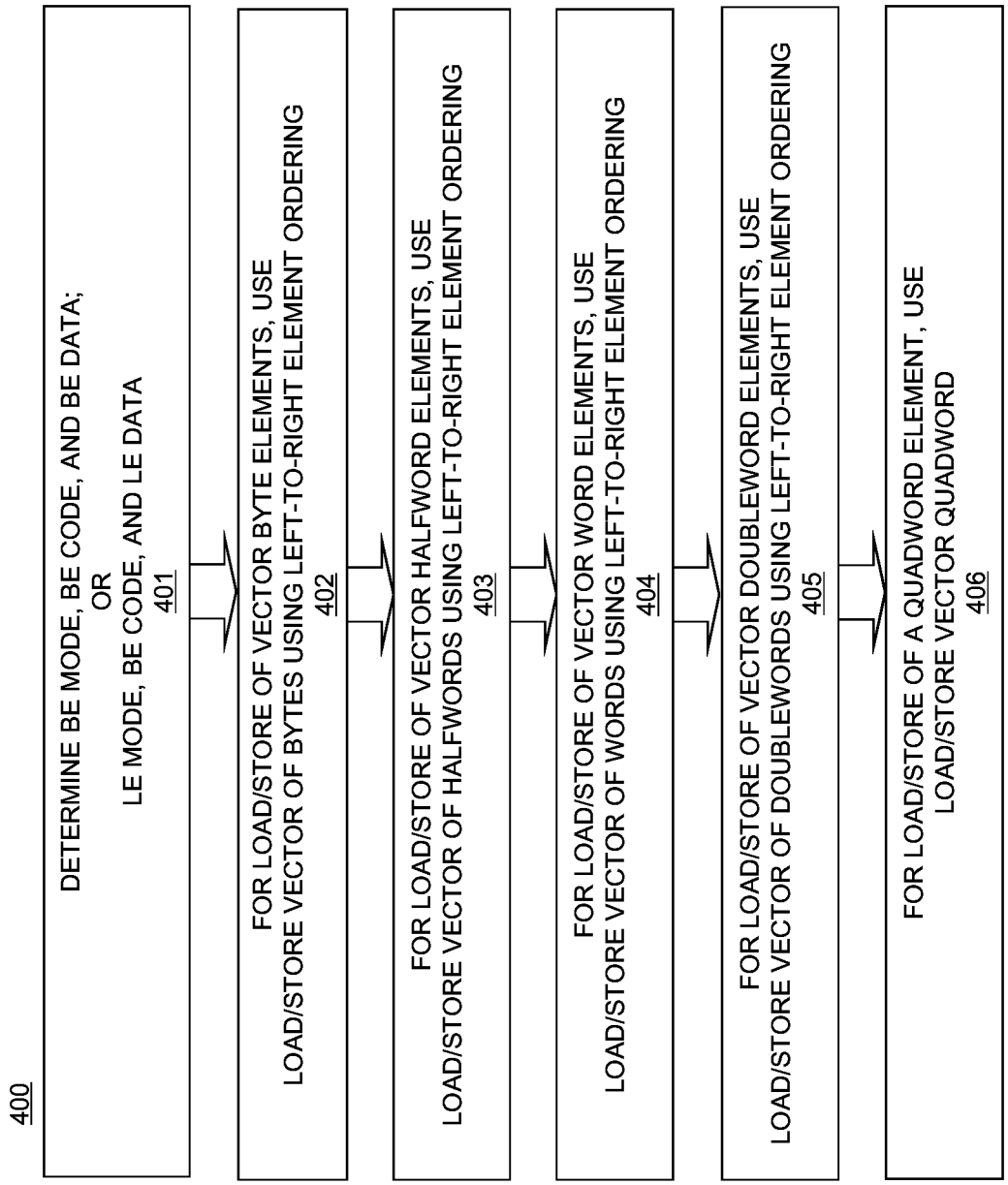

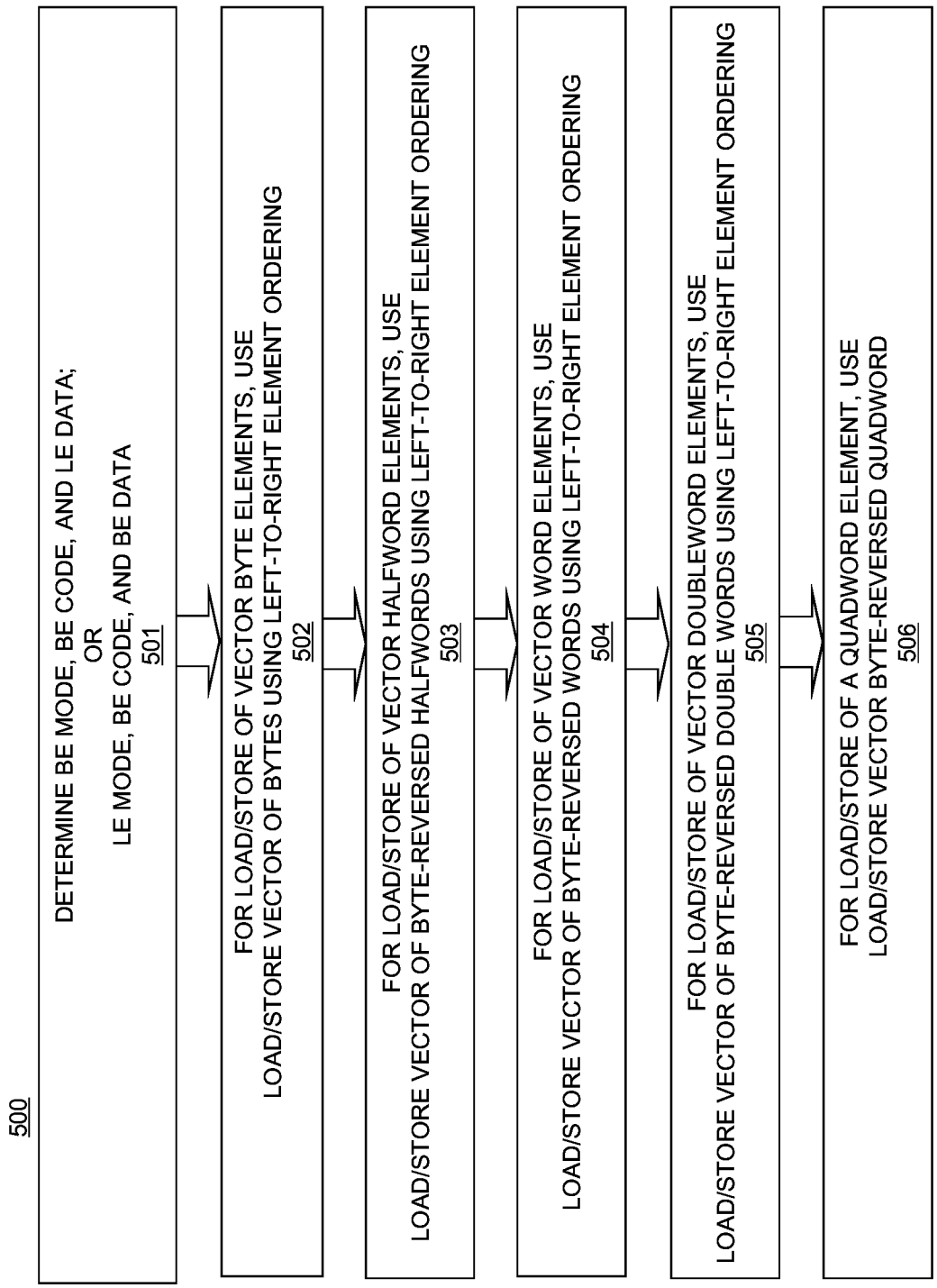

US 10,671,387 B2

VECTOR MEMORY ACCESS INSTRUCTIONS FOR BIG-ENDIAN ELEMENT ORDERED AND LITTLE-ENDIAN ELEMENT ORDERED COMPUTER CODE AND DATA

BACKGROUND

The present invention relates generally to computer systems, and more specifically, to vector memory access instructions for big-endian (BE) element ordered and little-endian (LE) element ordered computer code and data.

A computer system may implement a big-endian (BE) or a little-endian (LE) architecture. In a BE system, the most significant byte of an element in storage is stored in the smallest address in the element's memory location, and the least significant byte is stored in the largest address. In a LE system, the least significant byte of the element is stored in the smallest address in the element's memory location, and the most significant byte is stored in the largest address. For example, Intel™ systems are LE systems, while IBM z/Achitecture™ systems are BE systems. Complexity is introduced with the emergence of vector processing where a single vector storage access involves a plurality of values. BE systems have traditionally implemented vector comprised of a plurality of elements that are numbered 0 to N−1 from the leftmost element to the rightmost element, LE systems have traditionally implemented vector comprised of a plurality of elements that are numbered 0 to N−1 from the rightmost element to the leftmost element. The ordering of elements in a vector becomes an issue for certain vector operations that reference an element of the vector. BE systems will typically implement these instructions to reference the element as an index from the leftmost element, while LE systems will typically implement these instructions to reference the element as an index from the rightmost element.

SUMMARY

Embodiments include a system and computer program product for vector memory access instructions for big-endian (BE) element ordered and little-endian (LE) element ordered computer code. An aspect includes determining a mode of a computer system, the mode comprising one of a BE mode and an LE mode. Another aspect includes determining a code type of object code that is to be executed on the computer system, the code type comprising one of code that was written for a BE system or code that was written for an LE system. Another aspect includes determining a data type of data in a main memory of the computer system that is associated with the object code, wherein the data type comprises one of BE data and LE data. Another aspect includes based on the determination of the mode, code type, and data type, inserting a memory access instruction into the object code to perform a memory access associated with the vector in the object code, such that the memory access instruction performs element ordering of elements of the vector, and data ordering within the elements of the vector, in accordance with the determined mode, code type, and data type.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts a process flow for vector memory access instructions for BE and LE computer code in accordance with an embodiment;

FIG. 4 depicts a process flow for vector memory access instructions for BE code operating on BE data on a BE mode computer system, or BE code operating on LE data on a LE mode computer system in accordance with an embodiment;

FIG. 5 depicts a process flow for vector memory access instructions for BE code operating on LE data on a BE mode computer system, or BE code operating on BE data on a LE mode computer system in accordance with an embodiment;

DETAILED DESCRIPTION

Figure 1:
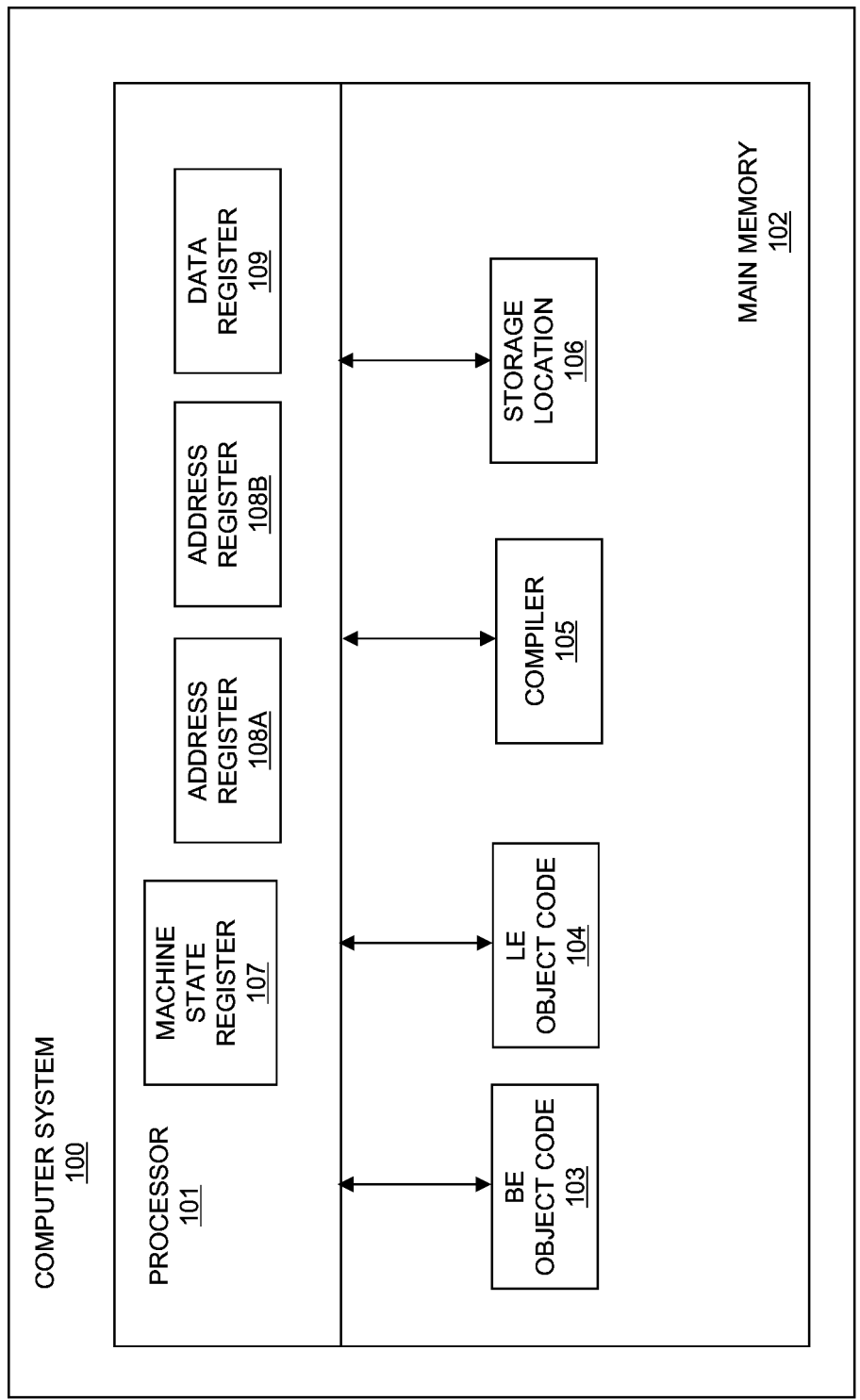
FIG. 1 depicts a computer system for vector memory access instructions for BE element ordered and LE element ordered computer code in accordance with an embodiment.

Embodiments of vector memory access instructions for BE and LE computer code are provided, with exemplary embodiments being discussed below in detail. It is difficult to port software that was written for a BE system to a LE system, and software that was written for a LE system to a BE system, or develop applications that combine code originally written for systems of one data ordering and code written for the other data ordering in a single application. It is also difficult to migrate data produced on a LE system to a BE system and data produced on a BE system to a LE system; the problem is exacerbated when considering a combination of BE versus LE systems, BE versus LE software, and BE versus LE data. Byte-reversing data as the data is loaded into registers may provide portability for some data types; however, byte-reversal may corrupt a data type that includes multiple, elements, e.g., a vector type. For example, a vector that is stored in a single memory element may include an element of type float, which is a word or 4 bytes, and an element of type double, which is a doubleword or 8 bytes; within each vector, the data in the vector may be scrambled by load/store operations between different modes. Therefore, a set of load/store instructions are provided for use with vector data, in order to allow LE and BE code to work on LE or BE systems with LE or BE data. In some embodiments, a single computer system may implement both LE and BE modes; in such an embodiment, the mode (either LE or BE) of the computer system may be indicated by a machine state register (MSR). In other embodiments, the mode may be indicated by a storage attribute specified in a storage control structure, such as a page table entry, corresponding to the location in main memory that is being accessed. In other embodiments, a single computer system may implement only LE mode or only BE mode.

The provided load/store instructions allow both LE element ordering and BE element ordering to be supported by a single microprocessor, and support the efficient porting of applications written with LE or BE element ordering, and further to support interoperation of such application, such that a program may be composed of a first set of object code generated from computer source code expecting a first element ordering, and a second set of object code generated from computer source code expecting a second element ordering. The LE and BE code may thereby interoperate in a single application. Porting of applications that assume BE element ordering within vector code to a LE mode microprocessor, and porting of applications that assume LE element ordering within vector code to a BE mode microprocessor, are thereby enabled.

Four distinct sets of memory access (i.e., load/store) instructions may be provided in a computer system for handling vectors in LE and BE modes. The first set of memory access instructions may perform element ordering from right-to-left, and data ordering within each element from right-to-left; the second set of memory access instructions may perform element ordering from left-to-right, and data ordering within each element from right-to-left; the third set of memory access instructions may perform element ordering from right-to-left, and data ordering within each element from left-to-right; and the fourth third set of memory access instructions may perform element ordering from left-to-right, and data ordering within each element from left-to-right. Within each group of memory access instructions, instructions for loading and storing of various element types may be provided, such as byte, halfword, word, doubleword, and quadword. The selection of a set of memory access instructions to use for a particular instance of object code may be performed based on the mode of the computer system, the type of instance of object code, and the type of data that will be operated on by the object code.

FIG. 1 illustrates an embodiment of a computer system 100 for vector memory access instructions for BE and LE computer code. Computer system 100 comprises a processor 101 and a main memory 102. BE object code 103 and LE object code 104 is generated from program source code (not shown) by a compiler such as compiler 105, and is stored in main memory 102 for execution by processor 101. The BE object code 103 and LE object code 104 may be generated by a compiler that is located on a different computer system from computer system 100. In some embodiments, the BE object code 103 and the LE object code 104 may be part of the same software application. Memory location 106 is a memory location in main memory 102; main memory 102 comprises a plurality of memory locations such as memory location 106. Data that is stored in main memory 102 may be in either BE format or LE format. Processor 101 comprises various registers, including machine state register 107, address register(s) 108, and data register 109. MSR 107 indicates a mode (i.e., BE mode or LE mode) of the computer system 100; computer system 100 may implement either BE or LE mode based on the contents of MSR 107. Additional mode specifiers, such as data ordering, may be present in the MSR 107 in some embodiments. Address registers 108A-B hold values that can be used to produce an effective address (EA) of a memory location, such as memory location 106 in main memory 102, for load and store operations from and to main memory 102. The contents of address registers 108A and 108B are added to produce and EA. Data register 109 holds data that is retrieved by a load operation from main memory 102, or data that is to be stored by a store operation into main memory 102. Data register 109 may be the same size as memory location 106. Processor 101 may comprise a plurality of address registers such as address registers 108A-B, and data registers such as data register 109, for handling a plurality of load and store operations; each address register and data register may have a respective identifier. Address registers 108A-B and data register 109 may each be a general purpose register (GPR), and in some embodiments, processor 101 may have 32 total GPRs. Computer system 100 is shown for illustrative purposes only; in some embodiments, a computer system may only implement a single mode (i.e., either LE or BE mode).

Figure 2A:
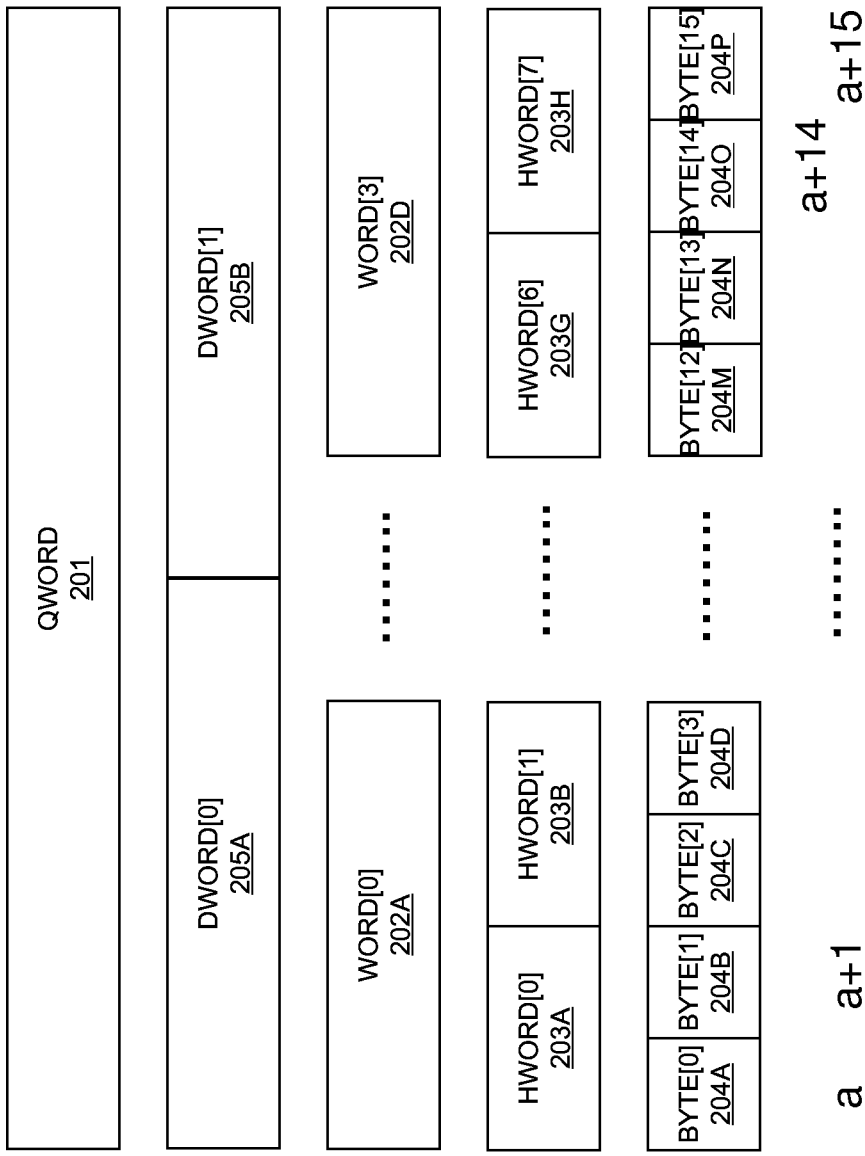
FIG. 2A depicts a memory location in a main memory in accordance with an embodiment.

FIG. 2A illustrate an embodiment of a memory location 200 that may comprise memory location 106 in main memory 102. Memory location 200 of FIG. 2A comprises a 16-byte memory location, and may comprise a single quadword 201, or a plurality of sub-locations, such as 2 doublewords 205A-B, 4 words 202A-D, 8 halfwords 203A-H, or 16 bytes 204A-P. There are also shown addresses corresponding to each byte starting with a first address "a" corresponding to byte[0] 204A through address "a+15" corresponding to byte[15] 204P. A register in the computer system that includes memory location 200, such as data register 109 of FIG. 1, may have the same size and structure as the memory location 200. Embodiments of a data register such as data register 109 are shown in FIG. 2B, corresponding to vector register with BE numbering, and FIG. 2C, corresponding to vector register with LE numbering.

Figure 2B:
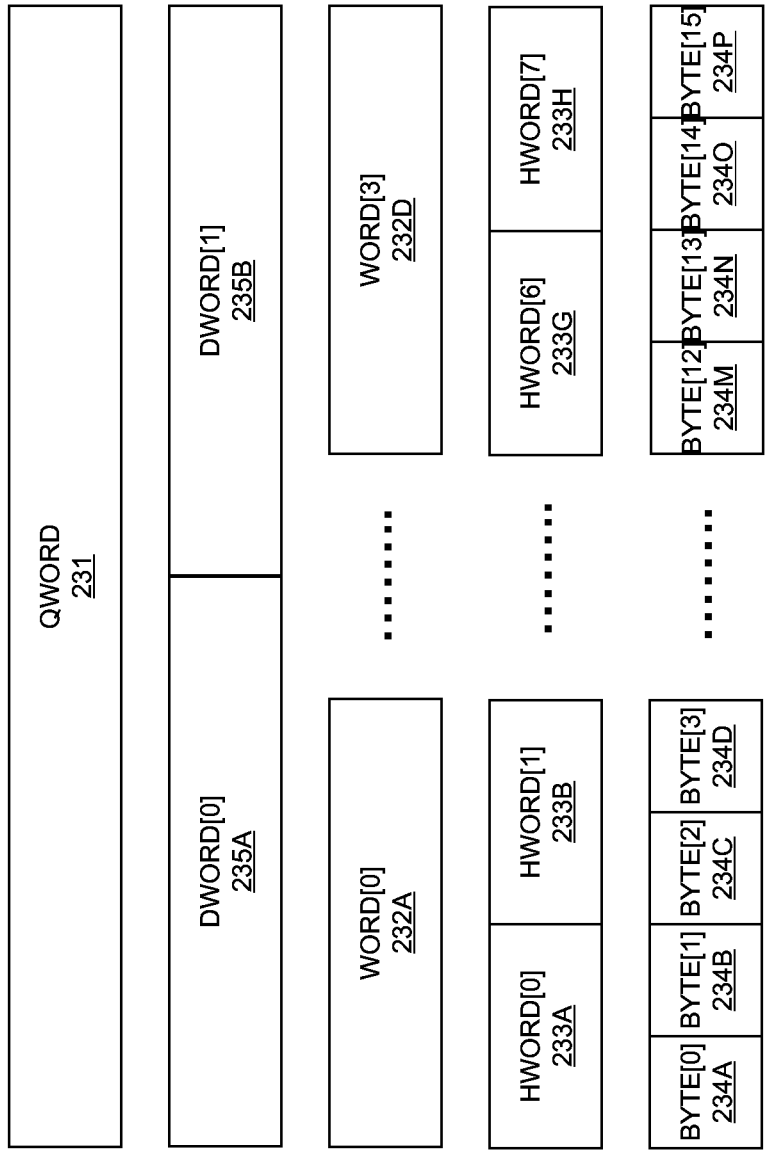
FIGS. 2B-C depict data registers in a computer system in accordance with various embodiments.
Figure 2C:
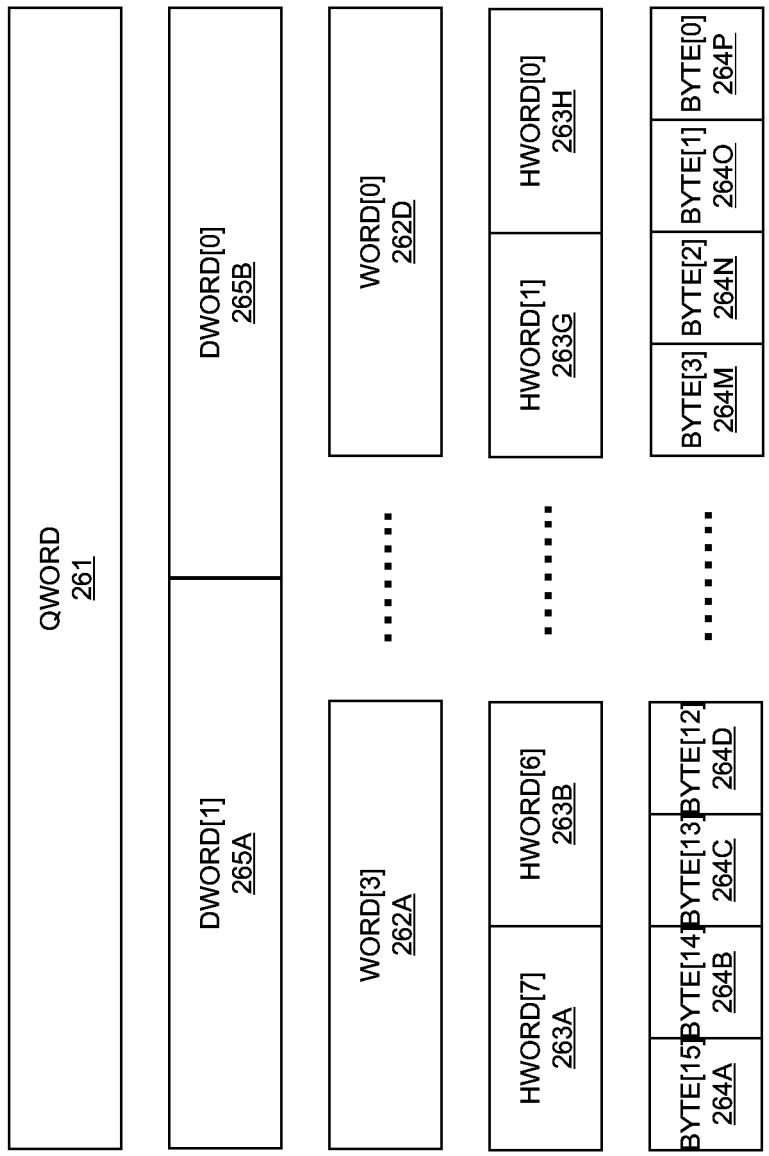

In the embodiment shown in FIG. 2, the sub-locations within memory location 200 are numbered from left-to-right. Memory location 200 is shown for illustrative purposes only; a memory location such as memory location 200 may have any appropriate size, and, in some embodiments, the sub-locations within the memory location may be numbered from right to left instead of from left to right as shown in FIG. 2A. For use of memory location 200 in a system that implements BE processing (both with respect to byte ordering within each data element and with respect to element ordering), an element is loaded from memory location 200 to vector register 230 as shown in FIG. 2B starting with the byte at the lowest address into the most significant byte of an element in element sub-location 0 on the left in a left to right sequence (for example, from byte[0] 234A to byte[15] 234P). This places the first element in the lowest-numbered position on the left in FIG. 2B, and so forth. For elements comprising multiple bytes, the most significant byte is placed to the left within each element, and the least significant byte at the right of an element within each sub-location (e.g., within each of words 232A-D). In a system that implements LE processing (both with respect to byte ordering within each data element and with respect to element ordering), an element is loaded from memory location 200 into vector register 260 (corresponding to storage similar to vector register 230, but shown to reflect LE numbering) with the byte with the lowest address in the lowest-numbered element in accordance to FIG. 2C (for example, from byte[0] 264P to byte[15] 264A, corresponding to the highest numbered element byte[15] 234P to byte[0] 234A in a BE register as shown in FIG. 2B). This places the first element in the lowest-numbered position on the right in FIG. 2C (corresponding to highest numbered position on the right of FIG. 2B in accordance with BE numbering of FIG. 2B), and so forth. Within each sub-location (i.e., within each of bytes 264A-P), the element data is stored in the reverse direction as compared to the BE system.

FIG. 3 depicts an embodiment of a method 300 for vector memory access instructions for BE and LE computer code in accordance with an embodiment. Method 300 may be implemented in a single computer system 100. First, in block 301, a mode of the computer system 100 is determined. The mode may be determined based on MSR 107 in some embodiments; for example, if MSR=1, the computer system 100 may be in BE mode, and if MSR=0, the computer system 100 may be in LE mode. In other embodiments, the computer system may only implement a single mode, which may be indicated by, for example, the operating system (OS), an architecture specification, or a data sheet. In further embodiments, the MSR may be updated to match the mode of the code that is being executed if they are different. Next, in block 302, it is determined what type of code is to be executed (i.e., code developed based on BE element ordering (such as BE object code 103), or code developed based on LE element ordering (such as LE object code 104)). An indication of the type of code may be stored in the code. In some embodiments, a single software application may include both BE object code and LE object code. In such an embodiment, different memory access instructions are used for vector memory access instructions in the BE object code versus the LE object code. Then, in block 303, it is determined what type of data (i.e., BE or LE byte ordered) in main memory 102 is being operated on by the object code. In some embodiments, the data byte ordering may be indicated by MSR 107. In other embodiments, the data byte ordering is determined based on the encoding of the particular vector memory access instruction. In block 304, based on these determinations, it is determined which type of vector load/store instructions to use to execute the object code. The various load store instructions are discussed below with respect to FIGS. 4-7, and are selected based on the mode, code type, and data type that were determined in block 301-303, and also based on the data types (e.g., byte, halfword, word, doubleword, and/or quadword) that are referenced by each load or store instruction. Then, in block 305, the object code is executed with the appropriate load/store instructions. Each load instruction and store instruction has a different respective opcode that is processed by processor 101, and further includes an EA that gives a location in the main memory 102 that holds the data that is to be retrieved for a load instruction, or a location to which the data is to be stored for a store instruction (the EA may be stored in one or both of address registers 108A-B), and a data register identifier that specifies one of the data registers (such as data register 109) in processor 101 in which to store the loaded data for a load instruction, or from which to retrieve the data to be stored for a store instruction. In FIGS. 4-7, and the accompanying tables 1A-B to 16A-B below, it is assumed that the sub-locations in each memory location are numbered from left-to-right as shown in memory location 200 of FIG. 2; however, in some embodiments, the numbering of the sub-locations may be from right-to-left, and the operations described below with respect to FIGS. 4-7 and Tables 1A-B to 16A-B may be reversed appropriately.

In Tables 1A-B to 16A-B below, example instruction formats are given; each comprises opcode and extended opcode fields, which together determine which instruction to use; RA and RB fields, which each indicate respective address registers 108A-B for the instruction, and T and TX fields (for a load) or S and SX fields (for a store), which together indicate the data register 109 for the instruction. In some embodiments, the instruction format may be 32 bits long; the opcode field may be 6 bits, the T (or S) field may be 5 bits, field RA may be 5 bits, field RB may also be 5 bits, the extended opcode may be 10 bits, and TX (or SX) may be 1 bit. T+TX (or S+SX), RA, and RB each total 5 bits for a system having 32 GPRs available. In such embodiments, the opcode/extended opcode fields are non-contiguous, as are the T and TX (or S and SX) fields. The EA for the instruction is the sum of the contents of address register RA and the contents of the address register RB; if the value of one of the address register fields equals zero, there is only 1 address register for the instruction, and the contents of the address register indicated by the other, non-zero address register field is the EA.

FIG. 4 depicts an embodiment of a method 400 for vector memory access instructions for BE code operating on BE data on a BE mode computer system, or BE code operating on LE data on a LE mode computer system in accordance with an embodiment. First, in block 401, it is determined by blocks 301-303 of FIG. 3 that BE object code 103 is operating on BE data on a BE mode computer system, or BE object code 103 is operating on LE data on a LE mode computer system. In block 402, for a load or store of vector byte elements, LOAD/STORE VECTOR OF BYTES USING LEFT-TO-RIGHT ELEMENT ORDERING instructions are used, which are illustrated below in Tables 1A-B. In block 403, for a load or store of vector halfword elements, LOAD/STORE VECTOR OF HALFWORDS USING LEFT-TO-RIGHT ELEMENT ORDERING instructions are used, which are illustrated below in Tables 2A-B. In block 404, for a load or store of vector word elements, LOAD/STORE VECTOR OF WORDS USING LEFT-TO-RIGHT ELEMENT ORDERING instructions are used, which are illustrated below in Tables 3A-B. In block 405, for a load or store of vector doubleword elements, LOAD/STORE VECTOR OF DOUBLEWORDS USING LEFT-TO-RIGHT ELEMENT ORDERING instructions are used, which are illustrated below in Tables 4A-B. In block 406, for a load or store of a quadword element, LOAD/STORE VECTOR QUADWORD instructions are used, which are illustrated below in Tables 5A-B. In some embodiments of BE code operating on BE data on a BE mode computer system, blocks 402-405 may be omitted, and LOAD/STORE VECTOR QUADWORD may be used for all element types.

TABLE 1A

LOAD VECTOR OF BYTES USING LEFT-TO-RIGHT ELEMENT ORDERING

For each integer value i from 0 to 15, do:
  Place the contents of the byte in main memory 102 at address EA+i into
byte element i of the data register 109.
  In an embodiment, the instruction format is:
    [opcode][T][RA][RB][extended opcode][TX];
  and the instruction comprises:
    EA <- RA=0 ? GPR[RB] : GPR[RA] + GPR[RB];
    do i = 0 to 15
      VSR[32xTX+T].byte[i] <- MEM(EA+i, 1)
    end

TABLE 1B

STORE VECTOR OF BYTES USING LEFT-TO-RIGHT ELEMENT ORDERING

For each integer value i from 0 to 15, do:
  Place the contents of byte element i of the data register 109 into the
byte in

TABLE 1B-continued

STORE VECTOR OF BYTES USING LEFT-TO-RIGHT ELEMENT ORDERING main memory 102 at address EA+i.
In an embodiment, the instruction format is:
   [opcode][S][RA][RB][extended opcode][SX];
and the instruction comprises:
   EA <- RA=0 ? GPR[RB] : GPR[RA] + GPR[RB];
   do i = 0 to 15
      MEM(EA+i, 1) <- VSR[32xSX+S].byte[i]
   end

TABLE 2A

LOAD VECTOR OF HALFWORDS USING LEFT-TO-RIGHT ELEMENT ORDERING

For each integer value i from 0 to 7, do:
   If the MSR indicates BE mode, place the contents of the halfword in main memory 102 at address EA+2xi into halfword element i of the data register 109 in such an order that the contents of the byte in main memory 102 at address EA+2xi are placed into byte sub-element 0 of halfword element i of the data register 109, and the contents of the byte in main memory 102 at address EA+2xi+1 are placed into byte sub-element 1 of halfword element i of the data register 109; or
   If the MSR indicates LE mode, place the contents of the halfword in main memory 102 at address EA+2xi into halfword element i of the data register 109 in such an order that the contents of the byte in main memory 102 at address EA+2xi are placed into byte sub-element 1 of halfword element i of the data register 109, and the contents of the byte in main memory 102 at address EA+2xi+1 are placed into byte sub-element 0 of halfword element i of the data register 109.
In an embodiment, the instruction format is:
   [opcode][T][RA][RB][extended opcode][TX];
and the instruction comprises:
   EA <- RA=0 ? GPR[RB] : GPR[RA] + GPR[RB];
   do i = 0 to 7
      VSR[32xTX+T].hword[i] <- MEM(EA+2xi, 2)
   end

TABLE 2B

STORE VECTOR OF HALFWORDS USING LEFT-TO-RIGHT ELEMENT ORDERING

For each integer value i from 0 to 7, do:
   If the MSR indicates BE mode, place the contents of halfword element i of the data register 109 into the halfword in main memory 102 at address EA+2xi in such an order that the contents of byte sub-element 0 of halfword element i of the data register 109 are placed into the byte in main memory 102 at address EA+2xi, and the contents of byte sub-element 1 of halfword element i of the data register 109 are placed into the byte in main memory 102 at address EA+2xi+1; or
   If the MSR indicates LE mode, place the contents of halfword element i of the data register 109 into the halfword in main memory 102 at address EA+2xi in such an order that the contents of byte sub-element 1 of halfword element i of the data register 109 are placed into the byte in main memory 102 at address EA+2xi, and the contents of byte sub-element 0 of halfword element i of the data register 109 are placed into the byte in main memory 102 at address EA+2xi+1.
In an embodiment, the instruction format is:
   [opcode][S][RA][RB][extended opcode][SX];
and the instruction comprises:
   EA <- RA=0 ? GPR[RB] : GPR[RA] + GPR[RB];
   do i = 0 to 7
      MEM(EA+2xi, 2) <- VSR[32xSX+S].hword[i]
   end

TABLE 3A

LOAD VECTOR OF WORDS USING LEFT-TO-RIGHT ELEMENT ORDERING

For each integer value i from 0 to 3, do:
   If the MSR indicates BE mode, place the contents of the word in main memory 102 at address EA+4xi into word element i of the data register 109 in such an order that the contents of the byte in main memory 102 at address EA+4xi are placed into byte sub-element 0 of word element i of the data register 109, and the contents of the byte in main memory 102 at address EA+4xi+3 are placed into byte sub-element 3 of word element i of the data register 109; or
   If the MSR indicates LE mode, place the contents of the word in main memory 102 at address EA+4xi into word element i of the data register 109 in such an order that the contents of the byte in main memory 102 at address EA+4xi are placed into byte sub-element 3 of word element i of the data register 109, and the contents of the byte in main memory 102 at address EA+4xi+3 are placed into byte sub-element 0 of word element i of the data register 109.
In an embodiment, the instruction format is:
   [opcode][T][RA][RB][extended opcode][TX];
and the instruction comprises:
   EA <- RA=0 ? GPR[RB] : GPR[RA] + GPR[RB];
   do i = 0 to 3
      VSR[32xTX+T].word[i] <- MEM(EA+4xi, 4)
   end

TABLE 3B

STORE VECTOR OF WORDS USING LEFT-TO-RIGHT ELEMENT ORDERING

For each integer value i from 0 to 3, do:
   If the MSR indicates BE mode, place the contents of word element i of the data register 109 into the word in main memory 102 at address EA+4xi in such an order that the contents of byte sub-element 0 of word element i of the data register 109 are placed into the byte in main memory 102 at address EA+4xi, and the contents of byte sub-element 3 of word element i of the data register 109 are placed into the byte in main memory 102 at address EA+4xi+3; or
   If the MSR indicates LE mode, place the contents of word element i of the data register 109 into the word in main memory 102 at address EA+4xi in such an order that the contents of byte sub-element 3 of word element i of the data register 109 are placed into the byte in main memory 102 at address EA+4xi, and the contents of byte sub-element 0 of word element i of the data register 109 are placed into the byte in main memory 102 at address EA+4xi+3.
In an embodiment, the instruction format is:
   [opcode ][S][RA][RB][extended opcode][SX];
and the instruction comprises:
   EA <- RA=0 ? GPR[RB] : GPR[RA] + GPR[RB];
   do i = 0 to 3
      MEM(EA+4xi, 4) <- VSR[32xSX+S].word[i]
   end

TABLE 4A

LOAD VECTOR OF DOUBLEWORDS USING LEFT-TO-RIGHT ELEMENT ORDERING

For each integer value i from 0 to 1, do:
   If the MSR indicates BE mode, place the contents of the doubleword in main memory 102 at address EA+8xi into doubleword element i of the data register 109 in such an order that the contents of the byte in main memory 102 at address EA+8xi are placed into byte sub-element 0 of doubleword element i of the data register 109, and the contents of the byte in main memory 102 at address EA+8xi+7 are placed into byte sub-element 7 of doubleword element i of the data register 109; or
   If the MSR indicates LE mode, place the contents of the doubleword in main memory 102 at address EA+8xi into doubleword element i of the data register 109 in such an order that the contents of the byte in main memory 102 at address EA+8xi are placed into byte sub-element 7 of doubleword element i of the data register 109, and the contents of the byte in main memory 102 at address EA+8xi+7 are placed into byte sub-element 0 of doubleword element i of the data register 109.
In an embodiment, the instruction format is:

TABLE 4A-continued

LOAD VECTOR OF DOUBLEWORDS USING LEFT-TO-RIGHT ELEMENT ORDERING

[opcode][T[RA][RB][extended opcode][TX];
and the instruction comprises:
    EA <- RA=0 ? GPR[RB] : GPR[RA] + GPR[RB];
    do i = 0 to 1
        VSR[32xTX+T].dword[i] <- MEM(EA+8xi, 8)
    end

TABLE 4B

STORE VECTOR OF DOUBLEWORDS USING LEFT-TO-RIGHT ELEMENT ORDERING

For each integer value i from 0 to 1, do:
    If the MSR indicates BE mode, place the contents of doubleword element i of the data register 109 into the doubleword in main memory 102 at address EA+8xi in such an order that the contents of byte sub-element 0 of doubleword element i of the data register 109 are placed into the byte in main memory 102 at address EA+8xi, and the contents of byte sub-element 7 of doubleword element i of the data register 109 are placed into the byte in main memory 102 at address EA+8xi+7 ; or
    If the MSR indicates LE mode, place the contents of doubleword element i of the data register 109 into the doubleword in main memory 102 at address EA+8xi in such an order that the contents of byte sub-element 7 of doubleword element i of the data register 109 are placed into the byte in main memory 102 at address EA+8xi, and the contents of byte sub-element 0 of doubleword element i of the data register 109 are placed into the byte in main memory 102 at address EA+8xi+7.
In an embodiment, the instruction format is:
    [opcode][S][RA][RB][extended opcode][SX];
and the instruction comprises:
    EA <- RA=0 ? GPR[RB] : GPR[RA] + GPR[RB];
    do i = 0 to 1
        MEM(EA+8xi, 8) <- VSR[32xSX+S].dword[i]
    end

TABLE 5A

LOAD VECTOR QUADWORD

If the MSR indicates BE mode, place the contents of the quadword in main memory 102 at address EA into the data register 109 in such an order that the contents of the byte in main memory 102 at address EA are placed into byte element 0 of the data register 109, and the contents of the byte in main memory 102 at address EA+15 are placed into byte element 15 of the data register 109; or
If the MSR indicates LE mode, place the contents of the quadword in main memory 102 at address EA into the data register 109 in such an order that the contents of the byte in main memory 102 at address EA are placed into byte element 15 of the data register 109, and the contents of the byte in main memory 102 at address EA+15 are placed into byte element 0 of the data register 109.
In an embodiment, the instruction format is:
    [opcode][T][RA][RB][extended opcode][TX];
and the instruction comprises:
    EA <- RA=0 ? GPR[RB] : GPR[RA] + GPR[RB];
    VSR[32xTX+T] <- MEM(EA, 16)

TABLE 5B

STORE VECTOR QUADWORD

If the MSR indicates BE mode, place the contents of the data register 109 into the quadword in main memory 102 at address EA in such an order that the contents of byte element 0 of the data register 109 are placed into the byte in main memory 102 at address EA, and the contents of byte element 15 of the data register 109 are placed into the byte in main memory 102 at address EA+15; or
If the MSR indicates LE mode, place the contents of the data register 109 into the quadword in main memory 102 at address EA in such an order that the contents of byte element 15 of the data register 109 are

TABLE 5B-continued

STORE VECTOR QUADWORD placed into the byte in main memory 102 at address EA, and the contents of byte element 0 of the data register 109 are placed into the byte in main memory 102 at address EA+15.
In an embodiment, the instruction format is:
    [opcode][S][RA][RB][extended opcode][SX];
and the instruction comprises:
    EA <- RA=0 ? GPR[RB] : GPR[RA] + GPR[RB];
    MEM(EA, 16) <- VSR[32xSX+S]

FIG. 5 depicts an embodiment of a method 500 for vector memory access instructions for BE code operating on LE data on a BE mode computer system, or BE code operating on BE data on a LE mode computer system in accordance with an embodiment. First, in block 501, it is determined by blocks 301-303 of FIG. 3 that BE object code 103 is operating on LE data on a BE mode computer system, or BE object code 103 is operating on BE data on a LE mode computer system. In block 502, for a load or store of vector byte elements, LOAD/STORE VECTOR OF BYTES USING LEFT-TO-RIGHT ELEMENT ORDERING instructions are used, which are illustrated above in Tables 1A-B. In block 503, for a load or store of vector halfword elements, LOAD/STORE VECTOR OF BYTE-REVERSED HALFWORDS USING LEFT-TO-RIGHT ELEMENT ORDERING instructions are used, which are illustrated below in Tables 6A-B. In block 504, for a load or store of vector word elements, LOAD/STORE VECTOR OF BYTE-REVERSED WORDS USING LEFT-TO-RIGHT ELEMENT ORDERING instructions are used, which are illustrated below in Tables 7A-B. In block 505, for a load or store of vector doubleword elements, LOAD/STORE VECTOR OF BYTE-REVERSED DOUBLEWORDS USING LEFT-TO-RIGHT ELEMENT ORDERING instructions are used, which are illustrated below in Tables 8A-B. In block 506, for a load or store of a quadword element, LOAD/STORE VECTOR BYTE-REVERSED QUADWORD instructions are used, which are illustrated below in Tables 9A-B. In some embodiments of BE code operating on BE data on a LE mode computer system, blocks 502-505 may be omitted, and LOAD/STORE VECTOR BYTE-REVERSED QUADWORD may be used for all element types.

TABLE 6A

LOAD VECTOR OF BYTE-REVERSED HALFWORDS USING LEFT-TO-RIGHT ELEMENT ORDERING

For each integer value i from 0 to 7, do:
    If the MSR indicates BE mode, place the contents of the halfword in main memory 102 at address EA+2xi into halfword element i of the data register 109 in such an order that the contents of the byte in main memory 102 at address EA+2xi are placed into byte sub-element 1 of halfword element i of the data register 109, and the contents of the byte in main memory 102 at address EA+2xi+1 are placed into byte sub-element 0 of halfword element i of the data register 109; or
    If the MSR indicates LE mode, place the contents of the halfword in main memory 102 at address EA+2xi into halfword element i of the data register 109 in such an order that the contents of the byte in main memory 102 at address EA+2xi are placed into byte sub-element 0 of halfword element i of the data register 109, and the contents of the byte in main memory 102 at address EA+2xi+1 are placed into byte sub-element 1 of halfword element i of the data register 109.
In an embodiment, the instruction format is:
    [opcode][T][RA][RB][extended opcode][TX];
and the instruction comprises:
EA <- RA=0 ? GPR[RB] : GPR[RA] + GPR[RB];
do i = 0 to 7
    load_data <- MEM(EA+2xi, 2);

TABLE 6A-continued

LOAD VECTOR OF BYTE-REVERSED HALFWORDS USING LEFT-TO-RIGHT ELEMENT ORDERING

```
    do j = 0 to 1
        VSR[32xTX+T].hword[i].byte[j] <- load_data.byte[1-i]
    end
end
```

TABLE 6B

STORE VECTOR OF BYTE-REVERSED HALFWORDS USING LEFT-TO-RIGHT ELEMENT ORDERING

For each integer value i from 0 to 7, do:
    If the MSR indicates BE mode, place the contents of halfword element i of the data register 109 into the halfword in main memory 102 at address EA+2xi in such an order that the contents of byte sub-element 1 of halfword element i of the data register 109 are placed into the byte in main memory 102 at address EA+2xi, and the contents of byte sub-element 0 of halfword element i of the data register 109 are placed into the byte in main memory 102 at address EA+2xi+1; or
    If the MSR indicates LE mode, place the contents of halfword element i of the data register 109 into the halfword in main memory 102 at address EA+2xi in such an order that the contents of byte sub-element 0 of halfword element i of the data register 109 are placed into the byte in main memory 102 at address EA+2xi, and the contents of byte sub-element 1 of halfword element i of the data register 109 are placed into the byte in main memory 102 at address EA+2xi+1.
    In an embodiment, the instruction format is:
        [opcode][S][RA][RB][extended opcode][SX];
    and the instruction comprises:
EA <- RA=0 ? GPR[RB] : GPR[RA] + GPR[RB];
do i = 0 to 7
    do j = 0 to 1
        store_data.byte[1-i] <- VSR[32xSX+S].hword[i].byte[j]
    end;
    MEM(EA+2xi, 2) <- store_data
end

TABLE 7A

LOAD VECTOR OF BYTE-REVERSED WORDS USING LEFT-TO-RIGHT ELEMENT ORDERING

For each integer value i from 0 to 3, do:
    If the MSR indicates BE mode, place the contents of the word in main memory 102 at address EA+4xI into word element i of the data register 109 in such an order that the contents of the byte in main memory 102 at address EA+4xi are placed into byte sub-element 3 of word element i of the data register 109, and the contents of the byte in main memory 102 at address EA+4xi+3 are placed into byte sub-element 0 of word element i of the data register 109; or
    If the MSR indicates LE mode, place the contents of the word in main memory 102 at address EA+4xI into word element i of the data register 109 in such an order that the contents of the byte in main memory 102 at address EA+4xi are placed into byte sub-element 0 of word element i of the data register 109, and the contents of the byte in main memory 102 at address EA+4xi+3 are placed into byte sub-element 3 of word element i of the data register 109.
    In an embodiment, the instruction format is:
        [opcode][T][RA][RB][extended opcode][TX];
    and the instruction comprises:
EA <- RA=0 ? GPR[RB] : GPR[RA] + GPR[RB];
do i = 0 to 3
    load_data <- MEM(EA+4xi, 4);
    do j = 0 to 3
        VSR[32xTX+T].word[i].byte[j] <- load_data.byte[3-j]
    end
end

TABLE 7B

STORE VECTOR OF BYTE-REVERSED WORDS USING LEFT-TO-RIGHT ELEMENT ORDERING

For each integer value i from 0 to 3, do:
    If the MSR indicates BE mode, place the contents of word element i of the data register 109 into the word in main memory 102 at address EA+4xi in such an order that the contents of byte sub-element 3 of word element i of the data register 109 are placed into the byte in main memory 102 at address EA+4xi, and the contents of byte sub-element 0 of word element i of the data register 109 are placed into the byte in main memory 102 at address EA+4xi+3; or
    If the MSR indicates LE mode, place the contents of word element i of the data register 109 into the word in main memory 102 at address EA+4xi in such an order that the contents of byte sub-element 0 of word element i of the data register 109 are placed into the byte in main memory 102 at address EA+4xi, and the contents of byte sub-element 3 of word element i of the data register 109 are placed into the byte in main memory 102 at address EA+4xi+3.
    In an embodiment, the instruction format is:
        [opcode][S][RA][RB][extended opcode][SX];
    and the instruction comprises:
EA <- RA=0 ? GPR[RB] : GPR[RA] + GPR[RB];
do i = 0 to 3
    do j = 0 to 3
        store_data.byte[j] <- VSR[32xSX+S].word[i].byte[3-j]
    end;
    MEM(EA+4xi, 4) <- store_data
end

TABLE 8A

LOAD VECTOR OF BYTE-REVERSED DOUBLEWORDS USING LEFT-TO-RIGHT ELEMENT ORDERING

For each integer value i from 0 to 1, do:
    If the MSR indicates BE mode, place the contents of the doubleword in main memory 102 at address EA+8xi into doubleword element i of the data register 109 in such an order that the contents of the byte in main memory 102 at address EA+8xi are placed into byte sub-element 7 of doubleword element i of the data register 109, and the contents of the byte in main memory 102 at address EA+8xi+7 are placed into byte sub-element 0 ofdoubleword element i of the data register 109; or
    If the MSR indicates LE mode, place the contents of the doubleword in main memory 102 at address EA+8xi into doubleword element i of the data register 109 in such an order that the contents of the byte in main memory 102 at address EA+8xi are placed into byte sub-element 0 of doubleword element i of the data register 109, and the contents of the byte in main memory 102 at address EA+8xi+7 are placed into byte sub-element 7 of doubleword element i of the data register 109.
    In an embodiment, the instruction format is:
        [opcode][T][RA][RB][extended opcode][TX];
    and the instruction comprises:
EA <- RA=0 ? GPR[RB] : GPR[RA] + GPR[RB];
do i = 0 to 1
    load_data <- MEM(EA+8xi, 8);
    do j = 0 to 7
        VSR[32xTX+T].dword[i].byte[j] <- load_data.byte[7-j]
    end
end

TABLE 8B

STORE VECTOR OF BYTE-REVERSED DOUBLEWORDS USING LEFT-TO-RIGHT ELEMENT ORDERING

For each integer value i from 0 to 1, do:
    If the MSR indicates BE mode, place the contents of doubleword element i of the data register 109 into the doubleword in main memory 102 at address EA+8xi in such an order that the contents of byte sub-element 7 of doubleword element i of the data register 109 are placed into the byte in main memory 102 at address EA+8xi, and the contents of byte sub-element 0 of doubleword element i of the data register 109 are placed into the byte in main memory 102 at

TABLE 8B-continued

STORE VECTOR OF BYTE-REVERSED DOUBLEWORDS
USING LEFT-TO-RIGHT ELEMENT ORDERING address EA+8×i+7; or
 If the MSR indicates LE mode, place the contents of doubleword
element i of the data register 109 into the doubleword in main memory
102 at address EA+8×i in such an order that the contents of byte sub-
element 0 of doubleword element i of the data register 109 are placed
into the byte in main memory 102 at address EA+8×i, and the
contents of byte sub-element 7 of doubleword element i of the data
register 109 are placed into the byte in main memory 102 at address
EA+8×i+7.
 In an embodiment, the instruction format is:
  [opcode][S][RA][RB][extended opcode][SX];
 and the instruction comprises:
EA <- RA=0 ? GPR[RB] : GPR[RA] + GPR[RB];
do i = 0 to 1
 do j = 0 to 7
  store_data.byte[j] <- VSR[32xSX+S].dword[i].byte[7−j]
 end;
 MEM(EA+8xi, 8) <- store_data
end

TABLE 9A

LOAD VECTOR BYTE-REVERSED QUADWORD

If the MSR indicates BE mode, place the contents of the quadword
in main memory 102 at address EA into the data register 109 in such
an order that the contents of the byte in main memory 102 at address
EA are placed into byte element 15 of the data register 109, and the
contents of the byte in main memory 102 at address EA+15 are placed
into byte element 0 of the data register 109; or
 If the MSR indicates LE mode, place the contents of the quadword
in main memory 102 at address EA into the data register 109 in such
an order that the contents of the byte in main memory 102 at address
EA are placed into byte element 0 of the data register 109, and the
contents of the byte in main memory 102 at address EA+15 are placed
into byte element 15 of the data register 109.
 In an embodiment, the instruction format is:
  [opcode][T][RA][RB][extended opcode][TX];
 and the instruction comprises:
EA <- RA=0 ? GPR[RB] : GPR[RA] + GPR[RB];
load_data <- MEM(EA, 16);
do i = 0 to 15
 VSR [32xTX+T].byte[i] <- load_data.byte[15−i]
end

TABLE 9B

STORE VECTOR BYTE-REVERSED QUADWORD

Figure 6:
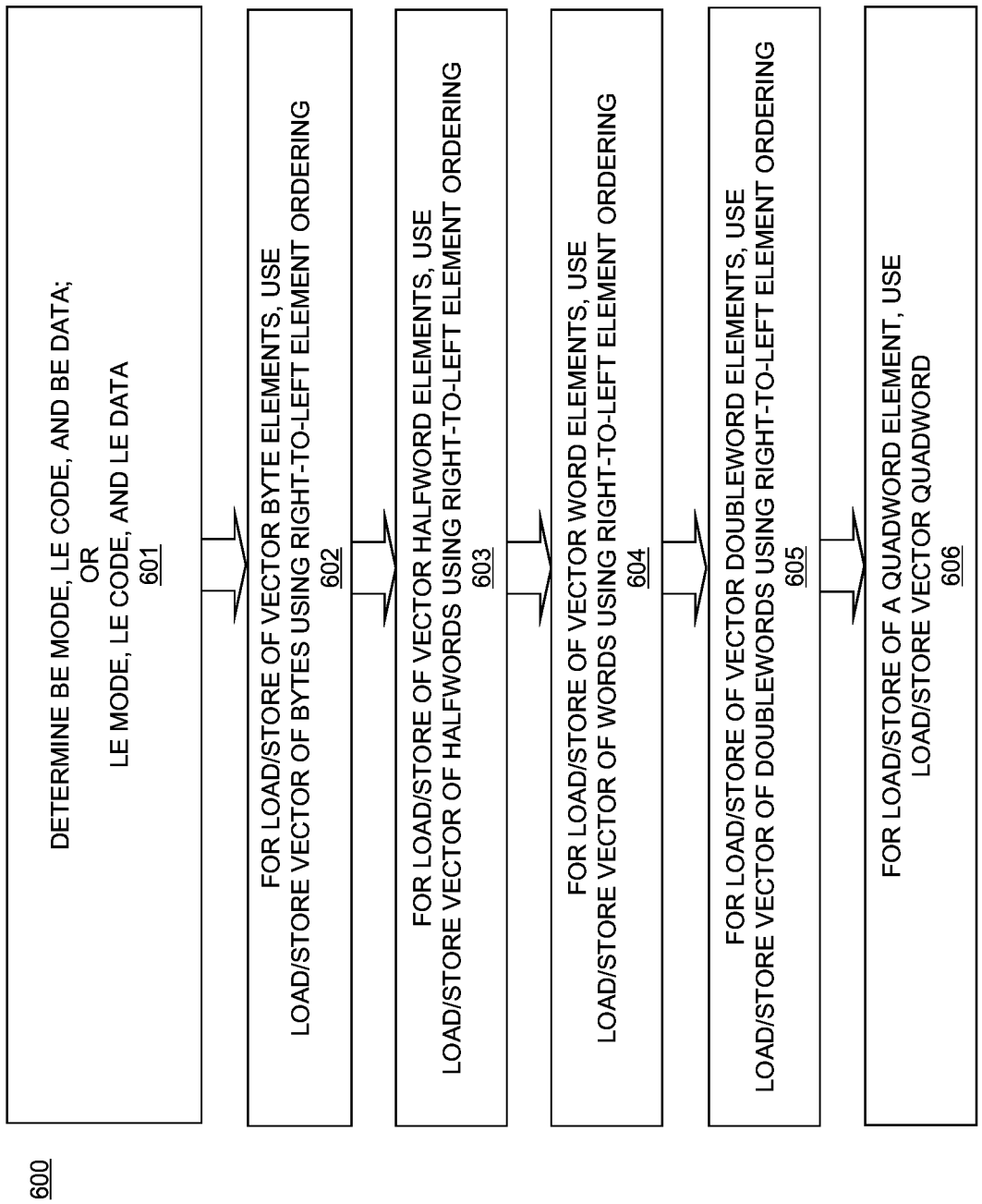
FIG. 6 depicts a process flow for vector memory access instructions for LE code operating on BE data on a BE mode computer system, or LE code operating on BE data on a LE mode computer system, or LE code operating on LE data on a LE mode computer system in accordance with an embodiment.

If the MSR indicates BE mode, place the contents of the data register
109 into the quadword in main memory 102 at address EA in such an
order
that the contents of byte element 15 of the data register 109 are placed
into
the byte in main memory 102 at address EA, and the contents of byte
element 0 of the data register 109 are placed into the byte in main
memory 102 at address EA+15; or
 If the MSR indicates LE mode, place the contents of the data register
109 into the quadword in main memory 102 at address EA in such an
order that the contents of byte element 0 of the data register 109 are
placed into the byte in main memory 102 at address EA, and the
contents of byte element 15 of the data register 109 are placed into the
byte in main memory 102 at address EA+15.
 In an embodiment, the instruction format is:
  [opcode][S][RA][RB][extended opcode][SX];
 and the instruction comprises:
EA <- RA=0 ? GPR[RB] : GPR[RA] + GPR[RB];
do i = 0 to 15
 store_data.byte [15−i]<- VSR[32xSX+S].byte[i]
end;
MEM(EA, 16) <- store_data FIG. 6 depicts an embodiment of a method 600 for vector memory access instructions for LE code operating on BE data on a BE mode computer system, or LE code operating on LE data on a LE mode computer system in accordance with an embodiment. First, in block 601, it is determined by blocks 301-303 of FIG. 3 that LE object code 104 is operating on BE data on a BE mode computer system, or LE object code 104 is operating on BE data on a LE mode computer system, or LE object code 104 is operating on LE data on a LE mode computer system. In block 602, for a load or store of vector byte elements, LOAD/STORE VECTOR OF BYTES USING RIGHT-TO-LEFT ELEMENT ORDERING instructions are used, which are illustrated below in Tables 10A-B. In block 603, for a load or store of vector halfword elements, LOAD/STORE VECTOR OF HALFWORDS USING RIGHT-TO-LEFT ELEMENT ORDERING instructions are used, which are illustrated below in Tables 11A-B. In block 604, for a load or store of vector word elements, LOAD/STORE VECTOR OF WORDS USING RIGHT-TO-LEFT ELEMENT ORDERING instructions are used, which are illustrated below in Tables 12A-B. In block 605, for a load or store of vector doubleword elements, LOAD/STORE VECTOR OF DOUBLEWORDS USING RIGHT-TO-LEFT ELEMENT ORDERING instructions are used, which are illustrated below in Tables 13A-B. In block 606, for a load or store of a quadword element, LOAD/STORE VECTOR QUADWORD instructions are used, which are illustrated above in Tables 5A-B. In some embodiments of LE code operating on LE data on a LE mode computer system, blocks 602-605 may be omitted, and LOAD/STORE VECTOR QUADWORD may be used for all element types.

TABLE 10A

LOAD VECTOR OF BYTES USING RIGHT-TO-LEFT ELEMENT
ORDERING

For each integer value i from 0 to 15, do:
 Place the contents of the byte in main memory 102 at address EA+i
into
byte element 15-i of the data register 109.
 In an embodiment, the instruction format is:
  [opcode][T][RA][RB][extended opcode][TX];
 and the instruction comprises:
  EA <- RA=0 ? GPR[RB] : GPR[RA] + GPR[RB];
  do i = 0 to 15
   VSR[32xTX+T].byte[15−i] <- MEM(EA+i, 1)
  end

TABLE 10B

STORE VECTOR OF BYTES USING RIGHT-TO-LEFT
ELEMENT ORDERING

For each integer value i from 0 to 15, do:
 Place the contents of byte element 15-i of the data register 109 into the
byte in main memory 102 at address EA+i.
 In an embodiment, the instruction format is:
  [opcode][S][RA][RB][extended opcode][SX];
 and the instruction comprises:
  EA <- RA=0 ? GPR[RB] : GPR[RA] + GPR[RB];
  do i = 0 to 15
   MEM(EA+i, 1) <- VSR[32xSX+S].byte[15−i]
  end

TABLE 11A

LOAD VECTOR OF HALFWORDS USING RIGHT-TO-LEFT ELEMENT ORDERING

For each integer value i from 0 to 7, do:
    If the MSR indicates BE mode, place the contents of the halfword in main memory 102 at address EA+2xi into halfword element 7-i of the data
register 109 in such an order that the contents of the byte in main memory 102 at address EA+2xi are placed into byte sub-element 0 of halfword element 7-i of the data register 109, and the contents of the byte in main memory 102 at address EA+2xi+1 are placed into byte sub-element 1 of halfword element 7-i of the data register 109; or
    If the MSR indicates LE mode, place the contents of the halfword in main memory 102 at address EA+2xi into halfword element 7-i of the data
register 109 in such an order that the contents of the byte in main memory 102 at address EA+2xi are placed into byte sub-element 1 of halfword element 7-i of the data register 109, and the contents of the byte in main memory 102 at address EA+2xi+1 are placed into byte sub-element 0 of halfword element 7-i of the data register 109.
    In an embodiment, the instruction format is:
        [opcode][T][RA][RB][extended opcode][TX];
    and the instruction comprises:
        EA <- RA=0 ? GPR[RB] : GPR[RA] + GPR[RB];
        do i = 0 to 7
            VSR[32xTX+T].hword[7-i] <- MEM(EA+2xi, 2)
        end

TABLE 11B

STORE VECTOR OF HALFWORDS USING RIGHT-TO-LEFT ELEMENT ORDERING

For each integer value i from 0 to 7, do:
    If the MSR indicates BE mode, place the contents of halfword element 7-i of the data register 109 into the halfword in main memory 102 at address
EA+2xi in such an order that the contents of byte sub-element 1 of halfword
element 7-i of the data register 109 are placed into the byte in main memory
102 at address EA+2xi, and the contents of byte sub-element 0 of halfword
element 7-i of the data register 109 are placed into the byte in main memory
102 at address EA+2xi+1; or
    If the MSR indicates LE mode, place the contents of halfword element 7-i of the data register 109 into the halfword in main memory 102 at address
EA+2xi in such an order that the contents of byte sub-element 0 of halfword
element 7-i of the data register 109 are placed into the byte in main memory
102 at address EA+2xi, and the contents of byte sub-element 1 of halfword
element 7-i of the data register 109 are placed into the byte in main memory
102 at address EA+2xi+1.
    In an embodiment, the instruction format is:
        [opcode][S][RA][RB][extended opcode][SX];
    and the instruction comprises:
        EA <- RA=0 ? GPR[RB] : GPR[RA] + GPR[RB];
        do i = 0 to 7
            MEM(EA+2xi, 2) <- VSR[32xSX+S].hword[7-i]
        end

TABLE 12A

LOAD VECTOR OF WORDS USING RIGHT-TO-LEFT ELEMENT ORDERING

For each integer value i from 0 to 3, do:
    If the MSR indicates BE mode, place the contents of the word in main memory 102 at address EA+4xi into word element 3-i of the data register 109 in such an order that the contents of the byte in main memory 102 at address EA+4xi are placed into byte sub-element 0 of word element 3-i of the data register 109, and the contents of the byte in main memory 102 at

TABLE 12A-continued

LOAD VECTOR OF WORDS USING RIGHT-TO-LEFT ELEMENT ORDERING address EA+4xi+3 are placed into byte sub-element 3 of word element 3-i of the data register 109; or
    If the MSR indicates LE mode, place the contents of the word in main memory 102 at address EA+4xi into word element 3-i of the data register 109 in such an order that the contents of the byte in main memory 102 at address EA+4xi are placed into byte sub-element 3 of word element 3-i of the data register 109, and the contents of the byte in main memory 102 at address EA+4xi+3 are placed into byte sub-element 0 of word element 3-i of the data register 109.
    In an embodiment, the instruction format is:
        [opcode][T][RA][RB][extended opcode][TX];
    and the instruction comprises:
        EA <- RA=0 ? GPR[RB] : GPR[RA] + GPR[RB];
        do i = 0 to 3
            VSR[32xTX+T].word[3-i] <- MEM(EA+4xi, 4)
        end

TABLE 12B

STORE VECTOR OF WORDS USING RIGHT-TO-LEFT ELEMENT ORDERING

For each integer value i from 0 to 3, do:
    If the MSR indicates BE mode, place the contents of word element 3-i of
the data register 109 into the word in main memory 102 at address
EA+4xi
in such an order that the contents of byte sub-element 0 of word element
3-i
of the data register 109 are placed into the byte in main memory 102 at
address EA+4xi, and the contents of byte sub-element 3 of word element
3-i
of the data register 109 are placed into the byte in main memory 102 at
address EA+4xi+3; or
    If the MSR indicates LE mode, place the contents of word element 3-i of
the data register 109 into the word in main memory 102 at address
EA+4xi
in such an order that the contents of byte sub-element 3 of word element
3-i
of the data register 109 are placed into the byte in main memory 102 at
address EA+4xi, and the contents of byte sub-element 0 of word element
3-i
of the data register 109 are placed into the byte in main memory 102 at
address EA+4xi+3.
    In an embodiment, the instruction format is:
        [opcode][S][RA][RB][extended opcode][SX];
    and the instruction comprises:
        EA <- RA=0 ? GPR[RB] : GPR[RA] + GPR[RB];
        do i = 0 to 3
            MEM(EA+4xi, 4) <- VSR[32xSX+S].word[3-i]
        end

TABLE 13A

LOAD VECTOR OF DOUBLEWORDS USING RIGHT-TO-LEFT ELEMENT ORDERING

For each integer value i from 0 to 1, do:
    If the MSR indicates BE mode, place the contents of the
doubleword in main memory 102 at address EA+8xi into doubleword
element 1-i of the data
register 109 in such an order that the contents of
the byte in main memory 102 at
address EA+8xi are placed into byte sub-element 0 of doubleword
element 1-i of the data register 109, and the
contents of the byte in main memory 102 at address
EA+8xi+7are placed into byte sub-element 7 of doubleword
element 1-i of the data register 109; or
    If the MSR indicates LE mode, place the contents of the doubleword
in main memory 102 at address EA+8xi into doubleword element 1-i of
the data register 109 in such an order that the contents of the
byte in main memory 102 at address EA+8xi are placed

TABLE 13A-continued

LOAD VECTOR OF DOUBLEWORDS USING RIGHT-TO-LEFT ELEMENT ORDERING into byte sub-element 7 of doubleword element 1-i of
the data register 109, and the contents of the byte in
main memory 102 at address EA+8xi+7are placed into byte
sub-element 0 of doubleword element 1-i of the
data register 109.
   In an embodiment, the instruction format is:
      [opcode][T][RA][extended opcode][TX];
   and the instruction comprises:
      EA <- RA=0 ? GPR[RB] : GPR[RA] + GPR[RB];
      do i = 0 to 1
         VSR[32xTX+T].dword[1-i] <- MEM(EA+8xi, 8)
      end

TABLE 13B

STORE VECTOR OF DOUBLEWORDS USING RIGHT-TO-LEFT ELEMENT ORDERING

Figure 7:
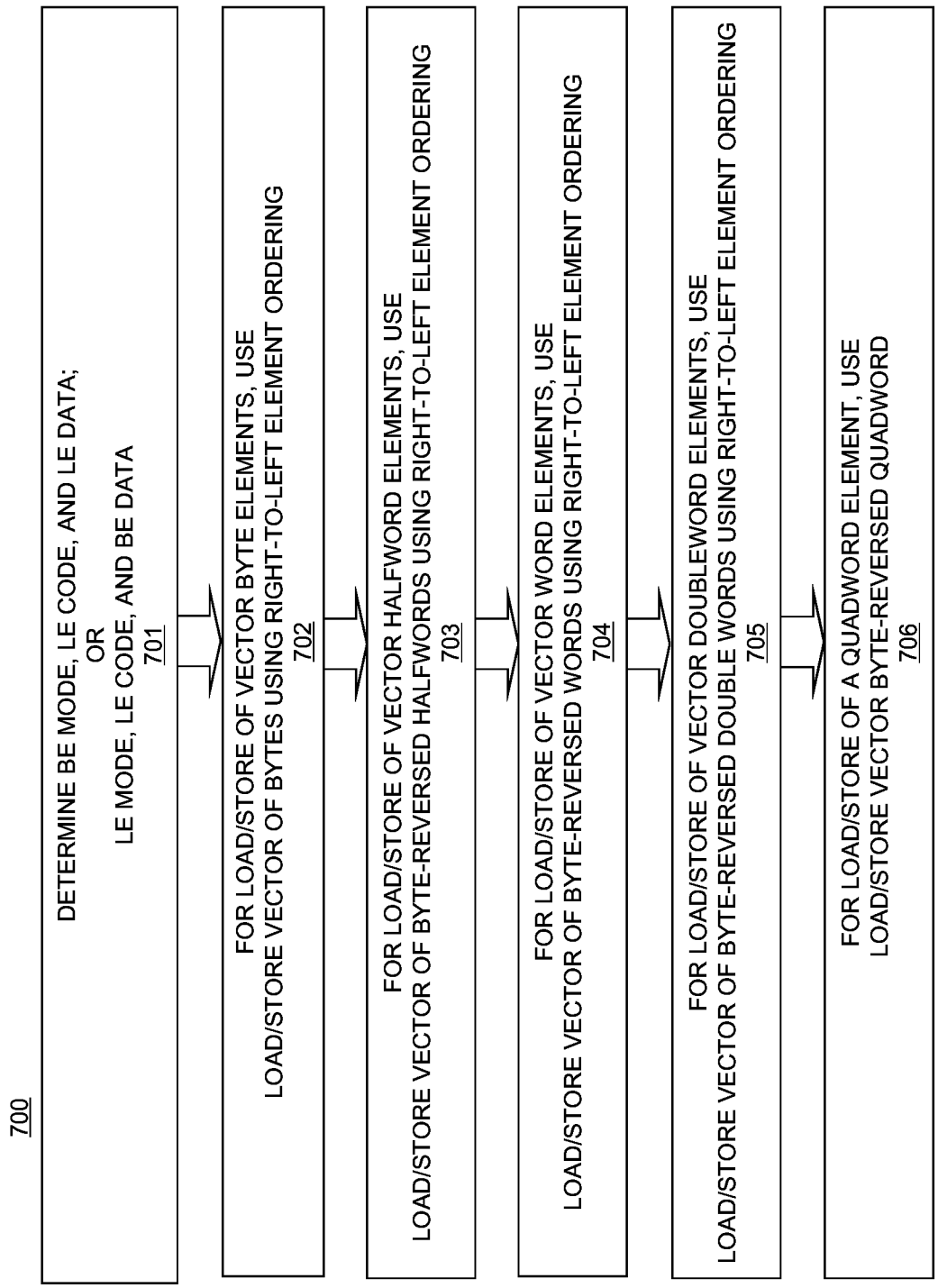
FIG. 7 depicts a process flow for vector memory access instructions for LE code operating on LE data on a BE mode computer system in accordance with an embodiment.

For each integer value i from 0 to 1, do:
   If the MSR indicates BE mode, place the contents of doubleword
element 1-i of the data register 109 into the doubleword in main
memory 102 at address EA+8xi in such an order that the contents
of byte sub-element 0 of doubleword element
1-i of the data register 109 are placed into the byte in
main memory 102 at address EA+8xi, and the contents of byte
sub-element 7 of doubleword element
1-i of the data register 109 are placed into the byte in main memory
102 at address EA+8xi+7; or
   If the MSR indicates LE mode, place the contents of doubleword element
1-i of the data register 109 into the doubleword in main memory 102 at
address EA+8xi in such an order that the contents of byte sub-element 7
of
doubleword element 1-i of the data register 109 are placed into the byte in
main memory 102 at address EA+8xi, and the contents of byte sub-element
0 of doubleword element 1-i of the data register 109 are placed into the
byte in main memory 102 at address EA+8xi+7.
   In an embodiment, the instruction format is:
      [opcode][S][RA][RB][extended opcode][SX];
   and the instruction comprises:
      EA <- RA=0 ? GPR[RB] : GPR[RA] + GPR[RB];
      do i = 0 to 1
         MEM(EA+8xi, 8) <- VSR[32xSX+S].word[1-i]
      end FIG. 7 depicts an embodiment of a method 700 for vector memory access instructions for LE code operating on BE data on a LE mode computer system, or LE code operating on LE data on a BE mode computer system in accordance with an embodiment. First, in block 401, it is determined by blocks 301-303 of FIG. 3 that LE object code 104 is operating on LE data on a BE mode computer system. In block 702, for a load or store of vector byte elements, LOAD/STORE VECTOR OF BYTES USING RIGHT-TO-LEFT ELEMENT ORDERING instructions are used, which are illustrated above in Tables 10A-B. In block 703, for a load or store of vector halfword elements, LOAD/STORE VECTOR OF BYTE-REVERSED HALFWORDS USING RIGHT-TO-LEFT ELEMENT ORDERING instructions are used, which are illustrated below in Tables 14A-B. In block 704, for a load or store of vector word elements, LOAD/STORE VECTOR OF BYTE-REVERSED WORDS USING RIGHT-TO-LEFT ELEMENT ORDERING instructions are used, which are illustrated in Tables 15A-B. In block 705, for a load or store of vector doubleword elements, LOAD/STORE VECTOR OF BYTE-REVERSED DOUBLEWORDS USING RIGHT-TO-LEFT ELEMENT ORDERING instructions are used, which are illustrated below in Tables 16A-B. In block 706, for a load or store of a quadword element, LOAD/STORE VECTOR BYTE-REVERSED QUADWORD instructions are used, which are illustrated above in Tables 9A-B. In some embodiments of LE code operating on LE data on a BE mode computer system, blocks 702-705 may be omitted, and LOAD/STORE VECTOR BYTE-REVERSED QUADWORD may be used for all element types.

TABLE 14A

LOAD VECTOR OF BYTE-REVERSED HALFWORDS USING RIGHT-TO-LEFT ELEMENT ORDERING

For each integer value i from 0 to 7, do:
   If the MSR indicates BE mode, place the contents of the halfword in
main memory 102 at address EA+2xi into halfword element 7-i
of the data register 109 in such an order that the
contents of the byte in main memory 102 at address
EA+2xi are placed into byte sub-element 1 of halfword element 7-i
of the data register 109, and the contents of the byte in main memory 102
at address EA+2xi+1 are placed into byte sub-element 0 of halfword
element 7-i of the data register 109; or
   If the MSR indicates LE mode, place the contents of the halfword in
main memory 102 at address EA+2xi into halfword element 7-i
of the data register 109 in such an order
that the contents of the byte in main memory 102 at address
EA+2xi are placed into byte sub-element 0 of
halfword element 7-i of the data register 109, and the
contents of the byte in main memory 102 at address
EA+2xi+1 are placed into byte sub-element 1 of halfword
element 7-i of the data register 109.
   In an embodiment, the instruction format is:
      [opcode][T][RA][RB][extended opcode][TX];
   and the instruction comprises:
   EA <- RA=0 ? GPR[RB] : GPR[RA] + GPR[RB];
   do i = 0 to 7
      load_data <- MEM(EA+2xi, 2);
      do j = 0 to 1
         VSR[32xTX+T].hword[7-i].byte[j] <- load_data.byte[1-i]
      end
end

TABLE 14B

STORE VECTOR OF BYTE-REVERSED HALFWORDS USING RIGHT-TO-LEFT ELEMENT ORDERING

For each integer value i from 0 to 7, do:
   If the MSR indicates BE mode, place the contents of halfword element
7-i
of the data register 109 into the halfword in main
memory 102 at address EA+2xi
in such an order that the contents of byte sub-element 1 of halfword
element 7-i of the data register 109 are placed into the byte in main
memory 102 at address EA+2xi, and the contents of byte sub-element 0 of
halfword element 7-i of the data register 109 are placed into the
byte in main memory 102 at address EA+2xi+1; or
   If the MSR indicates LE mode, place the contents of halfword element
7-i of the data register 109 into the halfword in main
memory 102 at address EA+2xi in such an order that
the contents of byte sub-element 0 of halfword element 7-i of
the data register 109 are placed into the byte in main memory 102 at
address
EA+2xi, and the contents of byte sub-element 1 of halfword
element 7-i of the data register 109 are placed into the byte in main
memory 102 at address EA+2xi+1.
   In an embodiment, the instruction format is:
      [opcode][S][RA][RB][extended opcode][SX];
   and the instruction comprises:
EA <- RA=0 ? GPR[RB] : GPR[RA] + GPR[RB];
do i = 0 to 7
   do j = 0 to 1
      store_data.byte[1-i] <- VSR[32xSX+S].hword[7-i].byte[j]
   end;
   MEM(EA+2xi, 2) <- store_data
end

TABLE 15A

LOAD VECTOR OF BYTE-REVERSED WORDS USING RIGHT-TO-LEFT ELEMENT ORDERING

For each integer value i from 0 to 3, do:
    If the MSR indicates BE mode, place the contents of the word in main memory 102 at address EA+4xI into word element 3-i of the data register 109 in such an order that the contents of the byte in main memory 102 at address EA+4xi are placed into byte sub-element 3 of word element 3-i of the data register 109, and the contents of the byte in main memory 102 at address EA+4xi+3 are placed into byte sub-element 0 of word element 3-i of the data register 109; or
    If the MSR indicates LE mode, place the contents of the word in main memory 102 at address EA+4xI into word element 3-i of the data register 109 in such an order that the contents of the byte in main memory 102 at address EA+4xi are placed into byte sub-element 0 of word element 3-i of the data register 109, and the contents of the byte in main memory 102 at address EA+4xi+3 are placed into byte sub-element 3 of word element 3-i of the data register 109.
    In an embodiment, the instruction format is:
        [opcode][T][RA][RB][extended opcode][TX];
    and the instruction comprises:
EA <- RA=0 ? GPR[RA] + GPR[RB];
do i = 0 to 3
    load_data MEM(EA+4xi, 4);
    do j = 0 to 3
        VSR[32xTX+T].word[3-i].byte[j] <- load_data.byte[3-j]
    end
end

TABLE 15B

STORE VECTOR OF BYTE-REVERSED WORDS USING RIGHT-TO-LEFT ELEMENT ORDERING

For each integer value i from 0 to 3, do:
    If the MSR indicates BE mode, place the contents of word element i of the data register 109 into the word in main memory 102 at address EA+4xi in such an order that the contents of byte sub-element 3 of word element 3-i of the data register 109 are placed into the byte in main memory 102 at address EA+4xi, and the contents of byte sub-element 0 of word element 3-i of the data register 109 are placed into the byte in main memory 102 at address EA+4xi+3; or
    If the MSR indicates LE mode, place the contents of word element i of the data register 109 into the word in main memory 102 at address EA+4xi in such an order that the contents of byte sub-element 0 of word element 3-i of the data register 109 are placed into the byte in main memory 102 at address EA+4xi, and the contents of byte sub-element 3 of word element 3-i of the data register 109 are placed into the byte in main memory 102 at address EA+4xi+3.
    In an embodiment, the instruction format is:
        [opcode][S][RA][RB][extended opcode][SX];
    and the instruction comprises:
EA <- RA=0 ? GP[RB] : GPR[RA] + GPR[RB];
do i = 0 to 3
    do j = 0 to 3
        store_data.byte[j] <- VSR[32xSX+S].word[3-i].byte[3-j]
    end;
    MEM(EA+4xi, 4) <- store_data
end

TABLE 16A

LOAD VECTOR OF BYTE-REVERSED DOUBLEWORDS USING RIGHT-TO-LEFT ELEMENT ORDERING

For each integer value i from 0 to 1, do:
    If the MSR indicates BE mode, place the contents of the doubleword in main memory 102 at address EA+8xi into doubleword element 1-i of the data register 109 in such an order that the contents of the byte in main

TABLE 16A-continued

LOAD VECTOR OF BYTE-REVERSED DOUBLEWORDS USING RIGHT-TO-LEFT ELEMENT ORDERING memory 102 at address EA+8xi are placed into byte sub-element 7 of doubleword element 1-i of the data register 109, and the contents of the byte in main memory 102 at address EA+8xi+7 are placed into byte sub-element 0 of doubleword element 1-i of the data register 109; or
    If the MSR indicates LE mode, place the contents of the doubleword in main memory 102 at address EA+8xi into doubleword element 1-i of the data register 109 in such an order that the contents of the byte in main memory 102 at address EA+8xi are placed into byte sub-element 0 of doubleword element 1-i of the data register 109, and the contents of the byte in main memory 102 at address EA+8xi+7 are placed into byte sub-element 7 of doubleword element 1-i of the data register 109.
    In an embodiment, the instruction format is:
        [opcode][T][RA][RB][extended opcode][TX];
    and the instruction comprises:
EA <- RA=0 ? GPR[RB] : GPR[RA] + GPR[RB];
do i = 0 to 1
    load_data <- MEM(EA+8xi, 8);
    do j = 0 to 7
        VSR[32xTX+T].dword[1-i].byte[j] <- load_data.byte[7-j]
    end
end

TABLE 16B

STORE VECTOR OF BYTE-REVERSED DOUBLEWORDS USING RIGHT-TO-LEFT ELEMENT ORDERING

For each integer value i from 0 to 1, do:
    If the MSR indicates BE mode, place the contents of doubleword element 1-i of the data register 109 into the doubleword in main memory 102 at address EA+8xi in such an order that the contents of byte sub-element 7 of doubleword element 1-i of the data register 109 are placed into the byte in main memory 102 at address EA+8xi, and the contents of byte sub-element 0 of doubleword element 1-i of the data register 109 are placed into the byte in main memory 102 at address EA+8xi+7; or
    If the MSR indicates LE mode, place the contents of doubleword element 1-i of the data register 109 into the doubleword in main memory 102 at address EA+8xi in such an order that the contents of byte sub-element 0 of doubleword element 1-i of the data register 109 are placed into the byte in main memory 102 at address EA+8xi, and the contents of byte sub-element 7 of doubleword element 1-i of the data register 109 are placed into the byte in main memory 102 at address EA+8xi+7.
    In an embodiment, the instruction format is:
        [opcode][S][RA][RB][extended opcode][SX];
    and the instruction comprises:
EA <- RA=0 ? GPR[RB] : GPR[RA] + GPR[RB];
do i = 0 to 1
    do j = 0 to 7
        store_data.byte[j] <- VSR[32xSX+S].dword[1-i].byte[7-j]
    end;
    MEM(EA+8xi, 8) <- store_data
end An LE mode microprocessor (which may comprise, for example, Power ISA but operating only in LE mode, or another processor such as a processor based on AMD's AMD64 ISA or the Intel implementation of said AMD64 ISA) may implement a first set of instructions that load LE data from the main memory at an arbitrarily-aligned address into a vector register with LE element ordering (i.e., right to left) with respect to one or more element types (e.g., in accordance with the vector register layout of FIG. 2C), and a second set of instructions that load LE data from the main memory at an arbitrarily-aligned address into a vector register in accordance with BE element ordering (i.e., left to right). In such a microprocessor, LE data may be stored from the vector register into the main memory at an arbitrarily-aligned address in accordance with BE element ordering (i.e., left to right) with respect to one vector element type (e.g., in accordance with the vector element types and layout shown for FIG. 2B, but reversing the data bytes within the selected element type in accordance byte ordering of data with little endian data byte ordering). Such an LE mode microprocessor may implement the load/store instructions that are shown in Tables 1A-B, 2A-B, 3A-B, 4A-B, and 5A-B corresponding to elements of byte, halfword, word, doubleword, and quadword size. Additional element sizes may be defined for the LE mode microprocessor in some embodiments, corresponding to power-of-2-sized elements, or non-power-of-2-sized elements, corresponding to a full vector register, or a portion of a vector register. The elements may correspond to one or more double word data types of integer, floating point, BCD, decimal floating point, or other data types of various sizes.

In some embodiments of BE processing that port from LE data codes, e.g., for a BE architecture such as IBM System z/Architecture, or another BE architecture, e.g., a BE Power ISA implementation, instructions are provided that load and store data from and to memory at an arbitrarily-aligned address with LE element ordering, but load and storing data with BE data ordering.

A single processor may support both LE and BE modes based on an MSR that determines data byte ordering. In such an embodiment, the BE mode may operate only on BE element ordering with BE data, but the LE mode may receive source code that is ported from a BE Power source code with BE element ordering and that operates on LE data, as well as LE source code (e.g., initially developed for LE Power ISA, or LE processors such as ARM or Intel), and employ both LE element ordering and LE data. In such an embodiment, there may be a first set of instructions that load and store vectors from and to memory at an arbitrarily-aligned addresses in BE mode in BE element ordering regardless of data type for BE mode data selected in the MSR, and also load and store vectors from and to memory at an arbitrarily-aligned addresses for BE mode data selected in the MSR for LE data ordering mode selected in the MSR.

In further embodiments, BE processing may supporting porting from LE data codes, e.g., for a Power ISA implementation providing enhanced porting support from LE source code to BE Power ISA, with instructions that load and store from and to memory at an arbitrarily-aligned addresses using data with LE element ordering but loading and storing data with BE data ordering. In such an embodiment, instructions for loading and storing from and to memory at an arbitrarily-aligned address using data with little-endian element ordering are provided that load elements from right to left in accordance with FIG. 2C.

In further embodiments, instructions may load and store from and to memory at arbitrarily-aligned addresses using elements with LE element ordering when the MSR indicates data big endian mode. In one embodiment, this operational mode is always active in the processor. In another embodiment, this operational mode for instructions is selected by a control activated via one of a one-time programmable bit at manufacture (e.g., e-fuse technology, or a onetime programmable EEPROM bit), a configuration register loaded at boot time, a supervisor (OS or HV) managed control (e.g., in an SPR) or an application managed control (e.g., in an SPR). Any appropriate means may be used for mode selection, including a chip pin selecting one of such operating modes that may be steered by external control logic, or personalize a processor when attached to a motherboard by directly connecting such control pin to one of GND or VDD.

Further, because the element ordering is selected by one of a first set of instructions and a second set of instructions, object codes of a first element ordering derived from source code targeting a first element ordering, and codes of a second element ordering derived from source code targeting a second element ordering can be combined in a single software application, thereby enabling writing of applications using libraries or other modules and functions developed originally for either of the two element layout orderings and regardless of the data byte ordering.

In accordance with another embodiment directed to a LE mode processor, the at least one first instruction corresponds to a load instruction and a store instruction as shown in Table 17A below that supports access to arbitrarily aligned or misaligned addresses in memory. In accordance with this embodiment directed at a LE mode processor, the at least one second instruction corresponds to an exemplary set of load instructions directed at operating upon doubleword and word elements in accordance with Tables 17B and 17C (and all supporting access to arbitrarily aligned or misaligned addresses in memory). In one aspect of such an embodiment, there is also supplied an instruction directed at operating upon elements of halfword size. In one aspect of such an embodiment, there is also supplied an instruction directed at operating upon elements of byte size, in accordance with Table 17D. Those skilled in the art will be able to define additional element sizes corresponding to power-of-2-sized elements, or non-power-of-2-sized elements, corresponding to a full vector register, or a portion of a vector register (and supporting access to arbitrarily aligned or misaligned addresses in memory). In one aspect said elements of (doubleword, word, halfword, and byte sizes) corresponding to one or more double word data types of integer, floating point, BCD, decimal floating point, or other types of the respective size.

In further embodiments directed to BE processing and supporting porting from LE data codes, e.g., for a BE architecture such as IBM System z/Architecture, or another big-endian architecture, e.g., a BE Power ISA implementation, instructions are provided that load data with LE element ordering and BE data ordering. A single processor may support both LE and BE modes, and based on an MSR that determines data byte ordering, may support access to arbitrarily aligned or misaligned memory addresses. In accordance with one such embodiment, the BE mode is may operate only on BE element orderings with BE data, but the LE mode is may receive BE source code that assumes BE element ordering for operating on LE data as well as LE source code that employs both LE element ordering and LE data. In accordance with one such embodiment, there is a first set of instructions that loads vectors in BE mode in BE element ordering regardless of data type for BE mode data selected in the MSR, and performing the operations previously described in conjunction with Tables 17A-D for LE data ordering mode selected in the MSR. The element ordering is also selected by the MSR.

There is also provided embodiments directed at BE processing that support porting from LE data codes that provide instructions for loading data with LE element ordering and BE data ordering. In one such embodiment, instructions directed at loading data with LE element ordering are provided corresponding to those of Tables 17B, 17C, and 17D, but loading elements from right to left in accordance with FIG. 2C.

In another such embodiment, instructions may load elements with LE element ordering when the MSR indicates data BE mode. In one embodiment, this operational mode is always active. In another embodiment, this operational mode for instructions is selected by a control activated via one of a one-time programmable bit at manufacture (e.g., e-fuse technology, or a onetime programmable EEPROM bit), a configuration register loaded at boot time, a supervisor (OS or HV) managed control e.g., in an SPR, or an application managed control (e.g., in an SPR). Any appropriate means may be used for mode selection, such as a chip pin that selects one of such operating modes that may be steered by external control logic, or configures a processor when attached to a motherboard by directly connecting a control pin to one of GND or VDD.

Further, because the element ordering is selected by one of a first set of instructions and a second set of instructions, e.g., Tables 17A and 17E; and Tables 17B, 17C, and 17D, respectively, object code of a first element ordering derived from source code targeting a first element ordering, and object code of a second element ordering derived from source code targeting a second element ordering can be combined in a single software application, thereby enabling to writing of applications using libraries or other modules and functions developed originally for either of the two element layout orderings and regardless of the data byte ordering.

TABLE 17A

LOAD/STORE VECTOR INDEXED

LOAD: the contents of the quadword in storage at address EA are placed
into data register 109 in such an order that the contents of the byte in
storage at address EA are placed into byte element 15 of data register 109,
the contents of the byte in storage at address EA+1 are placed into
byte element 14 of data register 109, and so forth until the contents
of the byte in storage at address EA+15 are placed into byte
element 0 of data register 109.
   In an embodiment, the load instruction format is:
      [opcode][T][RA][RB][extended opcode][TX];
   and the instruction comprises:
      if (TX=0 & MSR.VSX=0) then VSX_Unavailable( );
      if (TX=1 & MSR.VEC=0) then Vector_Unavailable( );
      EA <- RA=0 ? GPR[RB] : GPR[RA] + GPR[RB];
      VSR[32xTX+T] <- MEM(EA,16)
   STORE: the contents of data register 109 are placed into the quadword
in
storage at address EA in such an order that the
contents of byte element 15 of data register 109
are placed into the byte in storage at address EA, the contents of byte
element 14 of VSR[XS] are placed into the byte in storage at address
EA+1, and so forth until the contents of byte element 0 of data register
109
are placed into the byte in storage at address EA+15.
   In an embodiment, the store instruction format is:
      [opcode][S][RA][RB][extended opcode][SX];
   and the instruction comprises:
      if (SX=0 & MSR.VSX=0) then VSX_Unavailable( );
      if (SX=1 & MSR.VEC=0) then Vector_Unavailable( );
      EA <- RA=0 ? GPR[RB] : GPR[RA] + GPR[RB];
      MEM(EA,16) <- VSR[32xSX+S]

TABLE 17B

LOAD/STORE VECTOR DOUBLEWORD*2 INDEXED

LOAD: The contents of the doubleword in storage at address EA are
placed into doubleword element 0 of data register 109, and the contents
of the doubleword in storage at address EA+8 are placed into
doubleword element 1 of data register 109.
   In an embodiment, the load instruction format is:

TABLE 17B-continued

LOAD/STORE VECTOR DOUBLEWORD*2 INDEXED

[opcode][T][RA][RB][extended opcode][TX];
   and the instruction comprises:
      XT ← TX ∥ T
      a{0:63} <- (RA=0) ? 0 : GPR[RA]
      EA{0:63} <- a + GPR[RB]
      VSR[XT]{0:63} <- MEM(EA,8)
      VSR[XT]{64:127} <- MEM(EA+8,8)
   STORE: The contents of the doubleword in element 0 of data register
109 are placed into storage at address EA, and the contents the
doubleword element 1 of data register 109 of are placed into the
doubleword in storage at address EA+8.
   In an embodiment, the store instruction format is:
      [opcode][S][RA][RB][extended opcode][SX];
   and the instruction comprises:
      XS <- SX ∥ S
      a{0:63} <- (RA=0) ? 0 : GPR[RA]
      EA{0:63} <- a + GPR[RB]
      MEM(EA,8) <- VSR[XS]{0:63}
      MEM(EA+8,8) <- VSR[XS]{64:127}

TABLE 17C

LOAD/STORE VECTOR WORD*4 INDEXED

LOAD: The contents of the word in storage at address EA are placed
into
word element 0 of data register 109. The contents of the word in storage
at
address EA+4 are placed into word element 1 of data register 109. The
contents of the word in storage at address EA+8 are placed into word
element 2 of data register 109. The contents of the word in storage at
address EA+12 are placed into word element 3 of data register 109.
   In an embodiment, the load instruction format is:
      [opcode][T][RA][RB][extended opcode][TX];
   and the instruction comprises:
      XT <- TX ∥ T
      a{0:63} <- (RA=0) ? 0 : GPA[RA]
      EA{0:63} <-a + GPR[RB]
      VSR[XT]{0:31} <- MEM(EA,4)
      VSR[XT]{32:63} <- MEM(EA+4,4)
      VSR[XT]{64:95} <- MEM(EA+8,4)
      VSR[XT]{96:127} <- MEM(EA+12,4)
   STORE: The contents of word element 0 of data register 109 are placed
into the word in storage at address EA. The contents of word element 1
of data register 109 are placed into the word in storage at address EA+4.
The contents of word element 2 of data register 109 are placed into
the word in storage at address EA+8. The contents of word element 3 of
data register 109 are placed into the word in storage at address EA+12.
   In an embodiment, the store instruction format is:
      [opcode][S][RA][RB][extended opcode][SX];
   and the instruction comprises:
      XS <- SX ∥ S
      a{0:63} <- (RA=0) ? 0 : GPR[RA]
      EA{0:63} <- a + GPR[RB]
      MEM(EA,4) <- VSR[XS]{0:31}
      MEM(EA+4,4) <- VSR[XS]{32:63}
      MEM(EA+8,4) <- VSR[XS]{64:95}
      MEM(EA+12,4) <- VSR[XS]{96:127}

TABLE 17D

LOAD/STORE VECTOR BYTE*16 INDEXED

LOAD: For each integer value from 0 to 15, the contents of the byte in
storage at address EA+i are placed into byte element i of data register
109.
   In an embodiment, the load instruction format is:
      [opcode][T][RA][RB][extended opcode][TX];
   and the instruction comprises:
      if (TX=0 & MSR.VSX=0) then VSX_Unavailable( )
      if (TX=1 & MSR.VEC=0) then Vector_Unavailable( )
      EA <- ((RA=0) ? 0 : GPR[RA]) + GPR[RB]
      do i =0 to 15
         VSR[32xTX+T].byte[i] ← MEM(EA+i,1)

TABLE 17D-continued

LOAD/STORE VECTOR BYTE*16 INDEXED end
STORE: For each integer value from 0 to 15, the contents
of byte element i of data register 109 are placed into the byte in
storage at address EA+i.
In an embodiment, the store instruction format is:
[opcode][S][RA][RB][extended opcode][SX];
and the instruction comprises:
if (SX=0 & MSR.VSX=0) then VSX Unavailable( )
if (SX=1 & MSR.VEC=0) then Vector Unavailable( )
EA ← ((RA=0) ? 0 : GPR[RA]) +GPR[RB]
do i = 0 to 15
MEM(EA+i,1) ← VSR[32×SX+S].byte[i]
end

TABLE 17E

LOAD/STORE VECTOR INDEXED

LOAD: When BE byte ordering is employed, the contents of the
quadword in storage at address EA are placed into
data register 109 in such an order that; the contents of the
byte in storage at address EA are placed into byte
element 0 of data register 109, the contents of the byte in storage at
address EA+1 are placed into byte element 1 of data register 109,
and so forth until the contents of the byte in storage at address EA+15 are
placed into byte element 15 of data register 109.
When LE byte ordering is employed, the contents of the quadword in
storage at address EA are placed into data register
109 in such an order that the contents of the byte in
storage at address EA are placed into byte element 15 of
data register 109, the contents of the byte in
storage at address EA+1 are placed into byte element 14 of data
register 109, and so forth until - the contents of the
byte in storage at address EA+15 are placed into byte
element 0 of data register 109.
In an embodiment, the load instruction format is:
[opcode][T][RA][RB][extended opcode][TX];
and the instruction comprises:
if (TX=0 & MSR.VSX=0) then VSX_Unavailable( )
if (TX=1 & MSR.VEC=0) then Vector_Unavailable( )
EA ← ((RA=0) ? 0 : GPR[RA]) + GPR[RB]
VSR[32×TX+T] ← MEM(EA,16)
STORE: When BE byte ordering is employed, the contents of data
register 109 are placed into the quadword in
storage at address EA in such an order that the contents
of byte element 0 of data register 109 are placed into the
byte in storage at address EA, the contents of byte element 1 of data register
109 are placed into the byte in storage at address EA+1, and
so forth until - the contents of byte element 15 of data register 109
are placed into the byte in storage at address EA+15.
When LE byte ordering is employed, the contents of data register 109
are
placed into the quadword in storage at address EA in such an order that-
the
contents of byte element 15 of data register 109 are placed into the byte in
storage at address EA, the contents of byte element 14 of data register 109
are placed into the byte in storage at address EA+1,
and so forth until the contents of byte element 0 of data register 109
are placed into the byte in storage at address EA+15.
In an embodiment, the store instruction format is:
[opcode][S][RA][RB][extended opcode][SX];
and the instruction comprises:
if (SX=0 & MSR.VSX=0) then VSX_Unavailable( )
if (SX=1 & MSR.VEC=0) then Vector_Unavailable( )
EA ← ((RA=0) ? 0 : GPR[RA]) + GPR[RB]
MEM(EA,16) ← VSR[32×SX+S]

For BE code operating on BE data in BE mode, and for LE code operating on LE data in LE mode, when loading a vector from memory at an arbitrarily-unaligned address into a register or storing a vector from a register into memory at an arbitrarily-unaligned address, The instructions illustrated in Tables 5A-B may be used for vectors of all data types. In at least one embodiment, an arbitrarily unaligned address also includes an arbitrarily aligned address. Thus unaligned memory accesses are provided by providing a set of unaligned accesses delivering a byte stream in one of a preferred format (e.g., using BE code with BE data access, and providing one or more register-based transformations to generate another vector data sequence as part of an internally sequenced operation, e.g., microcode). For BE code operating on LE data in LE mode, when loading a vector from memory at an arbitrarily-unaligned address into a register, or storing a vector from a register into memory at an arbitrarily-unaligned address, the instructions illustrated in Tables 4A-B are used for vectors of doubleword elements, the instructions illustrated in Tables 3A-B are used for vectors of word elements, the instructions illustrated in Tables 2A-B are used for vectors of halfword elements, and the instructions illustrated in Tables 1A-B are used for vectors of byte elements.

For BE code operating on BE data in LE mode and for BE code operating on LE data in BE mode, when loading a vector from memory at an arbitrarily-unaligned address into a register or storing a vector from a register into memory at an arbitrarily-unaligned address, the instructions illustrated in Tables 9A-B are used for vectors of quadword elements, the instructions illustrated in Tables 8A-B are used for vectors of doubleword elements, the instructions illustrated in Tables 7A-B are used for vectors of word elements, the instructions illustrated in Tables 6A-B are used for vectors of halfword elements, and the instructions illustrated in Tables 1A-B are used for vectors of byte elements.

For LE code operating on BE data in BE mode, when loading a vector from memory at an arbitrarily-unaligned address into a register or storing a vector from a register into memory at an arbitrarily-unaligned an arbitrarily-unaligned address, the instructions illustrated in Tables 5A-B are used for vectors of quadword elements, the instructions illustrated in Tables 13A-B are used for vectors of doubleword elements, the instructions illustrated in Tables 12A-B are used for vectors of word elements, the instructions illustrated in Tables 11A-B are used for vectors of halfword elements, and the instructions illustrated in Tables 10A-B are used for vectors of byte elements.

For LE code operating on BE data in LE mode, and for LE code operating on LE data in BE mode, when loading a vector from memory at an arbitrarily-unaligned address into a register or storing a vector from a register into memory at an arbitrarily-unaligned address, the instructions illustrated in Tables 9A-B are used for vectors of quadword elements, the instructions illustrated in Tables 16A-B are used for vectors of doubleword elements, the instructions illustrated in Tables 15A-B are used for vectors of word elements, the instructions illustrated in Tables 14A-B are used for vectors of halfword elements, and the instructions illustrated in Tables 10A-B are used for vectors of byte elements.

In the foregoing, BE code refers to code using BE element ordering, and LE code refers to code employing LE element ordering, and optionally also element numbering. BE data and LE data refers to a preferred byte ordering, and optionally also byte numbering. BE mode and LE modes refer to the setting of a preferred data access mode in an MSR, e.g., determining a preferred data byte ordering and a preferred element ordering. In some embodiments at least one of preferred element and byte orderings, and optionally at least one of element and byte ordering, are modified by an instruction-specified preferred ordering and optionally numbering for at least one of element and byte ordering, either directly specified as LE or BE element or byte ordering, or specified as representing the opposite of the currently active mode, i.e., LE byte or element ordering (and optionally numbering) when MER specifies BE mode, and BE byte or element ordering (and optionally numbering) when MER specifies LE mode.

Technical effects and benefits include improved portability of BE code and LE code between BE and LE computer systems and/or modes.

Figure 8:
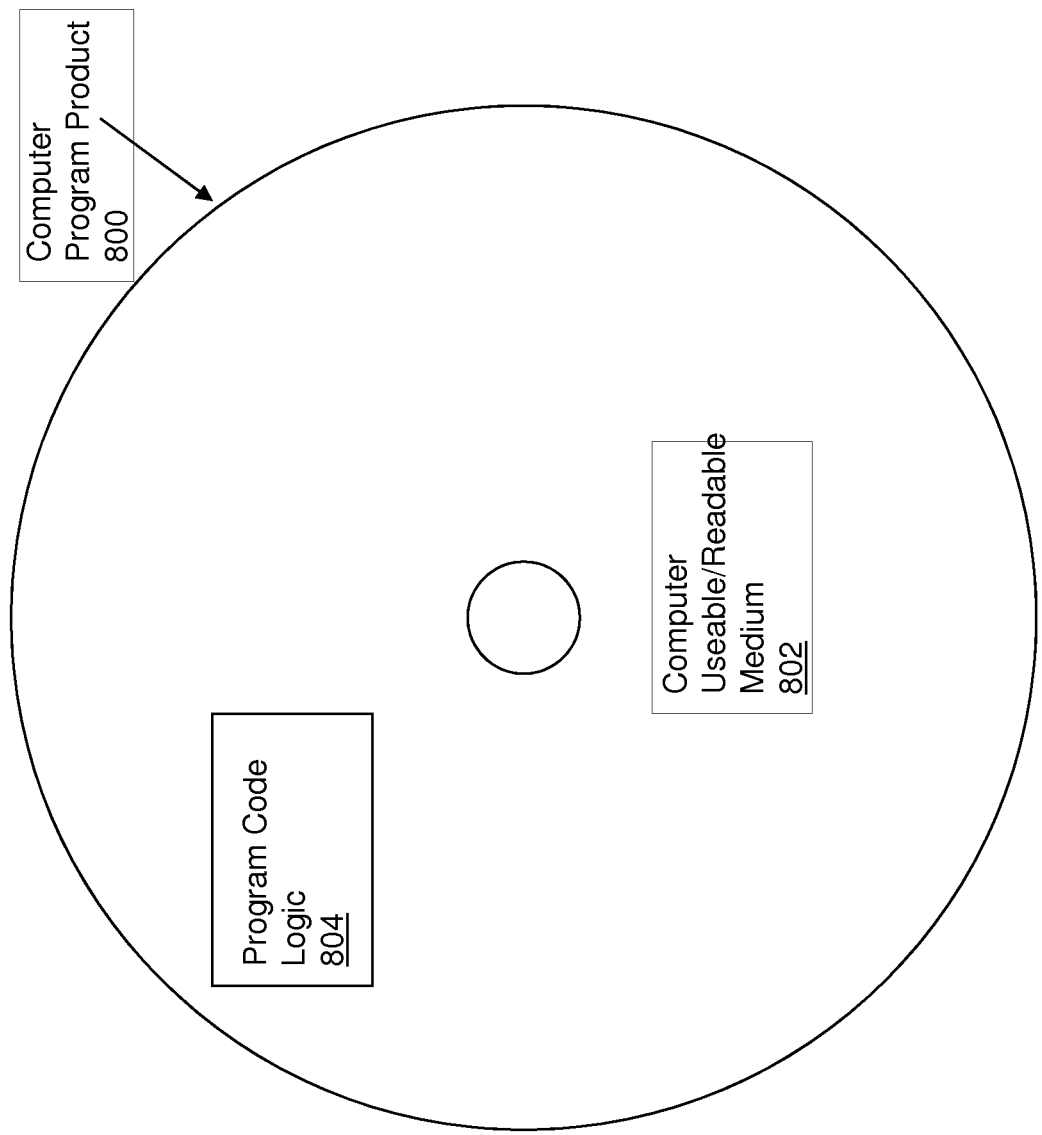
FIG. 8 depicts a computer-readable medium according to an embodiment.

Referring now to FIG. 8, in one example, a computer program product 800 includes, for instance, one or more storage media 802, wherein the media may be tangible and/or non-transitory, to store computer readable program code means or logic 804 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing vector memory access instructions big-endian (BE) element ordered computer code and little-endian (LE) element ordered computer code, the computer program product comprising:
    a computer readable storage medium having program instructions embodied therewith, the program instructions readable by a processing circuit to cause the processing circuit to perform a method comprising:
    determining, by a computer comprising a main memory and a processor, an element ordering of a vector memory access instruction, the element ordering comprising one of a BE mode and an LE mode;
    determining a byte ordering of data in the main memory, wherein the byte ordering of the data comprises one of BE data and LE data; and
    determining an element data type of a vector associated with the vector memory access instruction;
    based on determining that the element ordering of the vector memory instruction is the BE mode and the byte ordering of the data is BE data, or based on determining that the element ordering of the vector memory instruction is the LE mode and the byte ordering of the data is LE data, transferring vector elements of the vector of the determined element data type in a first manner corresponding to a same order as the byte ordering between the main memory and the processor; and
    based on determining that the element ordering of the vector memory instruction is the LE mode and the byte ordering of the data is BE data, or based on determining that the element ordering of the vector memory instruction is the LE mode and the byte ordering of the data is BE data, transferring vector elements of the vector of the determined element data type in a second manner corresponding to an opposite order as the byte ordering between the main memory and the processor,
    wherein the vector memory instruction is part of object code in a single program that comprises both BE element ordered object code and LE element ordered object code, and
    wherein executing the object code comprises executing the BE element ordered object code using a first group of memory access instructions corresponding to the first manner, and executing the LE element ordered object code using a second group of memory access instructions that correspond to the second manner.

2. The computer program product of claim 1, where transferring the vector elements comprises transferring the vector elements between an arbitrary address in the main memory and at least one register of the processor that is designated by the vector memory access instruction.

3. The computer program product of claim 1, wherein transferring the vector elements corresponds to one of a BE ordering and a LE ordering based on the data ordering being BE data.

4. The computer program product of claim 1, wherein transferring the vector elements corresponds to one of a BE ordering and a LE ordering based on the data ordering being LE data.

5. The computer program product of claim 1, wherein the transferring for a vector comprising a single vector element corresponds to transferring the single vector element in the second manner based on the element ordering being the same as the byte ordering.

6. A computer system for vector memory access instructions for big-endian (BE) element ordered computer code and little-endian (LE) element ordered computer code, the system comprising:
    a main memory; and
    a processor, communicatively coupled to said main memory, the computer system configured to perform a method comprising:
    determining an element ordering of a vector memory access instruction, the element ordering comprising one of a BE mode and an LE mode;
    determining a byte ordering of data in the main memory, wherein the byte ordering of the data comprises one of BE data and LE data; and
    determining an element data type of a vector associated with the vector memory access instruction;
    based on determining that the element ordering of the vector memory instruction is the BE mode and the byte ordering of the data is BE data, or based on determining that the element ordering of the vector memory instruction is the LE mode and the byte ordering of the data is LE data, transferring vector elements of the vector of the determined element data type in a first manner corresponding to a same order as the byte ordering between the main memory and the processor; and
    based on determining that the element ordering of the vector memory instruction is the LE mode and the byte ordering of the data is BE data, or based on determining that the element ordering of the vector memory instruction is the LE mode and the byte ordering of the data is BE data, transferring vector elements of the vector of the determined element data type in a second manner corresponding to an opposite order as the byte ordering between the main memory and the processor,
    wherein the vector memory instruction is part of object code in a single program that comprises both BE element ordered object code and LE element ordered object code, and
    wherein executing the object code comprises executing the BE element ordered object code using a first group of memory access instructions corresponding to the first manner, and executing the LE element ordered object code using a second group of memory access instructions that correspond to the second manner.

7. The system of claim 6, where transferring the vector elements comprises transferring the vector elements between an arbitrary address in the main memory and at least one register of the processor that is designated by the vector memory access instruction.

8. The system of claim 6, wherein transferring the vector elements corresponds to one of a BE ordering and a LE ordering based on the data ordering being BE data.

9. The system of claim 6, wherein transferring the vector elements corresponds to one of a BE ordering and a LE ordering based on the data ordering being LE data.

10. The system of claim 6, wherein the transferring for a vector comprising a single vector element corresponds to transferring the single vector element in the second manner based on the element ordering being the same as the byte ordering.

11. The computer program product of claim 1, wherein the element ordering of the data is determined based on a machine state register (MSR).

12. The computer program product of claim 1, wherein the element ordering of the data is determined based on an encoding of the vector memory access instruction.

13. The system of claim 6, wherein the element ordering of the data is determined based on a machine state register (MSR).

14. The system of claim 6, wherein the element ordering of the data is determined based on an encoding of the vector memory access instruction.

15. A computer implemented method for vector memory access instructions for big-endian (BE) element ordered computer code and little-endian (LE) element ordered computer code, the method comprising:
- determining, by a computer comprising a main memory and a processor, an element ordering of a vector memory access instruction, the element ordering comprising one of a BE mode and an LE mode;
- determining a byte ordering of data in the main memory, wherein the byte ordering of the data comprises one of BE data and LE data; and
- determining an element data type of a vector associated with the vector memory access instruction;
- based on determining that the element ordering of the vector memory instruction is the BE mode and the byte ordering of the data is BE data, or based on determining that the element ordering of the vector memory instruction is the LE mode and the byte ordering of the data is LE data, transferring vector elements of the vector of the determined element data type in a first manner corresponding to a same order as the byte ordering between the main memory and the processor; and
- based on determining that the element ordering of the vector memory instruction is the LE mode and the byte ordering of the data is BE data, or based on determining that the element ordering of the vector memory instruction is the LE mode and the byte ordering of the data is BE data, transferring vector elements of the vector of the determined element data type in a second manner corresponding to an opposite order as the byte ordering between the main memory and the processor,
- wherein the vector memory instruction is part of object code in a single program that comprises both BE element ordered object code and LE element ordered object code, and
- wherein executing the object code comprises executing the BE element ordered object code using a first group of memory access instructions corresponding to the first manner, and executing the LE element ordered object code using a second group of memory access instructions that correspond to the second manner.

16. The method of claim 15, wherein transferring the vector elements comprises transferring the vector elements between an arbitrary address in the main memory and at least one register of the processor that is designated by the vector memory access instruction.

17. The method of claim 15, wherein transferring the vector elements corresponds to one of a BE ordering and a LE ordering based on the data ordering being BE data.

18. The method of claim 15, wherein transferring the vector elements corresponds to one of a BE ordering and a LE ordering based on the data ordering being LE data.

19. The method of claim 15, wherein the transferring for a vector comprising a single vector element corresponds to transferring the single vector element in the second manner based on the element ordering being the same as the byte ordering.

20. The method of claim 15, wherein the element ordering of the data is determined based on a machine state register (MSR).

* * * * *